US008799186B2

(12) United States Patent
White et al.

(10) Patent No.: US 8,799,186 B2
(45) Date of Patent: Aug. 5, 2014

(54) CHOICE MODELLING SYSTEM AND METHOD

(75) Inventors: Ben White, Surry Hill (AU); Clayton Cross, Surry Hill (AU); Joshua Kennedy-White, Surry Hill (AU)

(73) Assignee: Survey Engine Pty Ltd., Surry Hill (AU)

( * ) Notice: Subject to any disclaimer, the term of this patent is extended or adjusted under 35 U.S.C. 154(b) by 0 days.

(21) Appl. No.: 13/882,867

(22) PCT Filed: Nov. 2, 2011

(86) PCT No.: PCT/AU2011/001405
§ 371 (c)(1),
(2), (4) Date: Jul. 10, 2013

(87) PCT Pub. No.: WO2012/058718
PCT Pub. Date: May 10, 2012

(65) Prior Publication Data
US 2013/0282626 A1    Oct. 24, 2013

(30) Foreign Application Priority Data
Nov. 2, 2010    (AU) .................. 2010904880

(51) Int. Cl.
*G06F 17/20*    (2006.01)
*G06F 17/00*    (2006.01)
*G06N 5/04*    (2006.01)
*G06N 99/00*    (2010.01)

(52) U.S. Cl.
CPC ............... *G06F 17/20* (2013.01); *G06F 17/00* (2013.01); *G06N 5/04* (2013.01); *G06N 99/005* (2013.01)
USPC ........................................................... 706/11

(58) Field of Classification Search
CPC ......... G06N 5/04; G06N 99/005; G09B 7/04; G06Q 10/10; G06F 17/00; G06F 17/20
USPC ................................................ 706/11, 62
See application file for complete search history.

(56) References Cited

U.S. PATENT DOCUMENTS 5,764,543 A    6/1998 Kennedy
5,790,778 A    8/1998 Bush et al.
(Continued)

FOREIGN PATENT DOCUMENTS

WO    WO 2009/135168    11/2009

OTHER PUBLICATIONS

Daly et al, "A general and operational representation of Generalised Extreme Value models", Transportation Research Part B 40 (2006) 285-305.*
Kuhfeld, "Marketing Research Methods in SAS Experimental Design, Choice, Conjoint, and Graphical Techniques", Jan. 1, 2005, SAS 9.1 Edition TS-722.*
Survey Engine Website—www.surveyengine.com—accessed on May 26, 2010.

(Continued)

*Primary Examiner* — Jeffrey A Gaffin
*Assistant Examiner* — Ilya Traktovenko
(74) *Attorney, Agent, or Firm* — Knobbe, Martens, Olson & Bear, LLP

(57) ABSTRACT

Systems and methods for choice experiments to model user behavior are disclosed. Choice experiment surveys require respondents to choose by performing trade-offs between combinations of features included in alternatives under consideration. Users specify constraints and an attribute space of features to investigate, and generate candidate experimental designs based on the constraints and attributes. Users select an optimum design tailored to the problem to be solved, instead of having to modify their problem to match a known experimental design. An online survey assembly module generates survey templates used by a data collection and sampling unit to display treatments to survey respondents. A model generation module analysis the collected data, and a model explorer module enables exploration of results. The system has the advantage of making choice modelling accessible to a wider range of users, and enables considerable freedom and scope to investigate problems of specific interest.

34 Claims, 14 Drawing Sheets

(56) References Cited

U.S. PATENT DOCUMENTS

| | | | |
|---|---|---|---|
| 6,009,407 | A | 12/1999 | Garg |
| 6,246,989 | B1 | 6/2001 | Polcyn |
| 6,581,048 | B1 | 6/2003 | Werbos |
| 6,778,807 | B1 | 8/2004 | Martino et al. |
| 6,826,541 | B1 | 11/2004 | Johnston et al. |
| 6,934,748 | B1 | 8/2005 | Louviere et al. |
| 7,565,615 | B2 | 7/2009 | Ebert |
| 2002/0004379 | A1 | 1/2002 | Gruhl et al. |
| 2002/0065699 | A1 | 5/2002 | Talluri et al. |
| 2003/0040952 | A1* | 2/2003 | Keil et al. ............... 705/10 |
| 2003/0050939 | A1 | 3/2003 | Dietz et al. |
| 2004/0043770 | A1* | 3/2004 | Amit et al. ............... 455/450 |
| 2004/0088392 | A1 | 5/2004 | Barrett et al. |
| 2005/0234688 | A1 | 10/2005 | Pinto et al. |
| 2006/0095306 | A1 | 5/2006 | Parker et al. |
| 2006/0104213 | A1 | 5/2006 | Sumner et al. |
| 2006/0117317 | A1 | 6/2006 | Crawford et al. |
| 2006/0149713 | A1 | 7/2006 | Walker |
| 2007/0241944 | A1 | 10/2007 | Coldren et al. |
| 2008/0263633 | A1* | 10/2008 | Banga et al. ............... 726/3 |
| 2009/0177506 | A1 | 7/2009 | Jiang |
| 2009/0307055 | A1 | 12/2009 | Karty |
| 2010/0235226 | A1* | 9/2010 | Keil et al. ............... 705/10 |
| 2010/0281355 | A1* | 11/2010 | White et al. ............... 715/222 |
| 2011/0076663 | A1* | 3/2011 | Krallman et al. ............... 434/362 |

OTHER PUBLICATIONS

Best_Worst Paper Example (Best-Worst_paper_example.pdf) "Consumer Study into Breakfast Cereals" available from Survey Engine Website (www.surveyengine.com)—accessed on May 26, 2010.

Credit Card Powerpoint presentation (credit_card.pdf) available from Survey Engine Website (www.surveyengine.com)—accessed on May 26, 2010.

Introduction to Choice Modelling Powerpoint presentation (dcm_basic.pdf) available from Survey Engine Website (www.surveyengine.com)—accessed on May 26, 2010.

Discrete Choice Wikipedia page—en.wikipedia.org/wiki/Discrete_Choice—accessed on May 26, 2010.

Choice Modelling Wikipedia page—en.wikipedia.org/wiki/Choice_Modelling—accessed on May 26, 2010.

Max Diff Wikipedia page—en.wikipedia.org/wiki/MaxDiff—accessed on May 26, 2010.

Logistic Regression Wikipedia page—en.wikipedia.org/wiki/Logistic_regression—accessed on May 26, 2010.

Multinomial Logit Wikipedia page—en.wikipedia.org/wiki/Multinomial_Logit—accessed on May 26, 2010.

International Search Report dated Feb. 17, 2012, issued in Int'l Appl. No. PCT/AU2011/001405, filed on Nov. 2, 2011.

Written Opinion dated Feb. 13, 2012, issued in Int'l Appl. No. PCT/AU2011/001405, filed on Nov. 2, 2011.

* cited by examiner

Figure 11A  Figure 11B
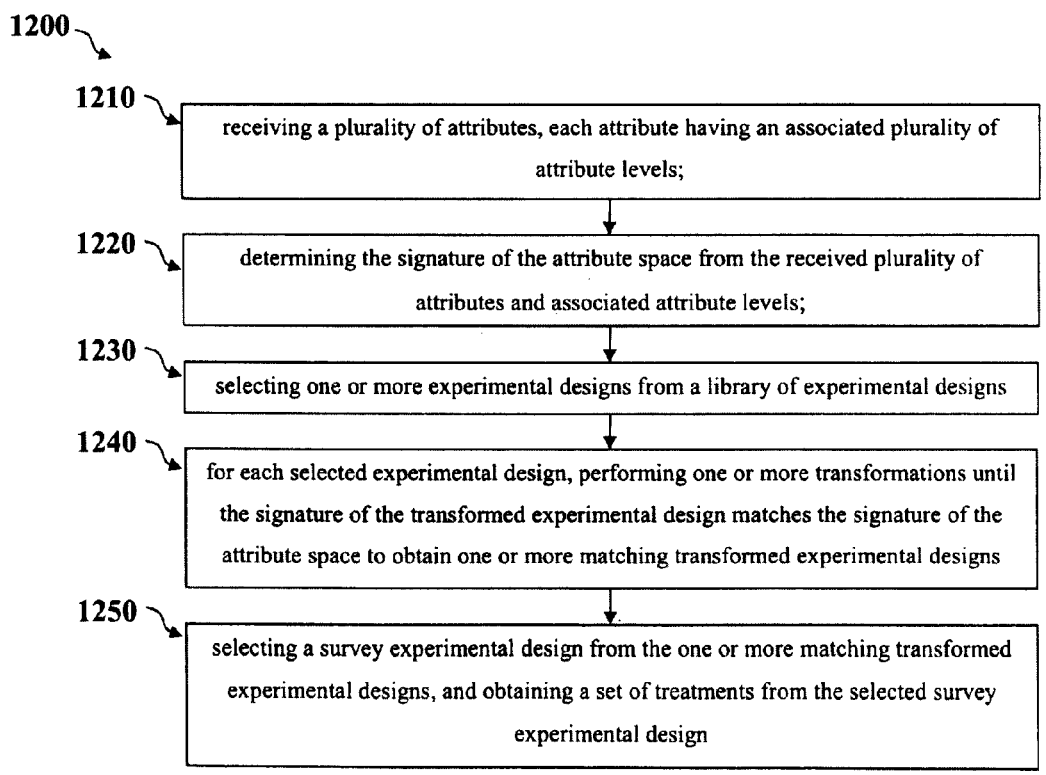
Figure 12

CHOICE MODELLING SYSTEM AND METHOD

PRIORITY DOCUMENTS

The present application claims priority from Australian Provisional Patent Application No 2010904880 entitled "Choice modelling system and method" and filed on 2 Nov. 2010, the entire content of which is hereby incorporated by reference in its entirety.

FIELD OF THE INVENTION

The present invention relates to a system for performing choice modelling.

BACKGROUND OF THE INVENTION

The ability to predict human behaviour to changes in their environment is of interest to decision makers in areas as diverse as retail, human resources and even traffic planning. For example, a product manager for a telecommunications company would like to know what the changes in market share would be, should he change the monthly plan fee or the number of calls cap. Armed with this information he could inform the current business strategy, which might be to increase market share, make more profit or some specific mix of objectives. The example described above could be answered through traditional market research approach known as A-B testing where each of the possible combinations of the price and plan attributes are presented to a target group and a count of the preference recorded. This count is taken as proxy for market share and a business strategy formed from it.

However, in all but trivial cases, there are many more attributes of interest than can be effectively studied in such traditional market research approaches. In the example above, it would be reasonable to also include the attributes of brand, handset, warranty, insurance, SMS cost, data plan and many more. In reality, the combinatorial mathematics involved precludes an exhaustive survey of alternatives as the number of combinations rapidly approaches and exceeds the number of people on the planet.

To predict human behaviour, a different approach is required, one where an understanding the factors driving choice is involved and a model of the decision making process is made. In this approach, model predictions stand in for frequency counts and statistical methods tell us how 'good' predictions from the model are. In recent years this approach has begun to be formalised into a related set of econometric methods known collectively as Choice Modelling (or sometimes Choice Experiments, the two terms will be used interchangeably).

The principal output of a choice modelling approach is a mathematical model capturing the essence of human decision making processes (as probabilistic decision rules, from which a numeric utility can be calculated). The model can be interrogated to make hard probabilistic predictions and validated to demonstrate how accurate predictions are. To generate a choice model a controlled experiment is often employed to explore preference for hypothetical options. Through judicious selection of these hypothetical options, via an experimental design, only a small subset of the vast numbers of combinations of attributes needs to be explored to create a valid choice model from which predictions can be made.

The intermediate steps of experimental design and modelling require a very high level of specialised skill in economics and mathematics. In addition the technical steps required to deploy a choice experiment and collect data require some technical skill. A layman, that is the typical person, product manager, decision maker or non expert user who wishes to understand their relevant market typically possesses none of these skills. Consequently the layman must employ or one or more specialists and go through all the manual steps of communicating, exploring and managing his requirements with the various specialists necessary.

The practical reality of using choice modelling is that it is a costly and time-consuming process with many of the activities outside of the control of the layman instigator. Furthermore, many interesting and useful applications of choice modelling are precluded because of the attendant costs and timeframes imposed because of the necessity of employing specialist guidance. While it is both feasible and desirable to predict human behaviour accurately with choice modelling, in its current state it could not be described as a single technology. It is instead an assemblage of academic theories and methods, manual procedures and disparate software components. Thus as a result, even when a layman employs specialist consultants, the lack of appropriately developed tools and methodologies, often forces the layman instigator into performing a much more limited study than they may otherwise desired, if at all.

There is thus a need to develop both individual components and an overall system to enable a lay person to implement choice experiments (or choice modelling), or at least to provide them with a useful alternative.

SUMMARY

According to a first aspect of the present invention, there is provided a computational system for performing an online choice model, the system comprising at least one processor and at least one memory operatively coupled to the at least one processor and comprising a plurality of modules comprising instructions for execution by the at least one processor, the plurality of modules comprising:

a problem definition module comprising a problem definition user interface for receiving a plurality of attributes from a user wherein each attribute has an associated plurality of attribute levels;

an online choice model survey module comprising:

an experimental design generator module for generating a survey experimental design and an associated plurality of treatments, comprising a library of experimental designs, wherein the experimental design generator module determines the signature of the attribute space from the received plurality of attributes and associated attribute levels and for one or more experimental designs in the library of experimental designs, performs one or more transformations until the signature of the transformed experimental design matches the signature of the attribute space to obtain one or more matching transformed experimental designs, and selecting the survey experimental design from the one or more matching transformed experimental designs, and obtaining a set of treatments from the selected survey experimental design an online survey assembly module which receives the plurality of treatments and assembles an online survey from one or more survey templates pages, and a plurality of treatment representations created using the plurality of treatments received from the experimental design module;

a data collection and sampling module for conducting the assembled online survey, wherein the data collection and sampling module allocates treatments to survey respondents and collects responses using the assembled online survey;

a model generation module for receiving the data collected by the data collection and sampling module and building a model to obtain a plurality of model parameter estimates and errors from which a utility estimate can be obtained for each attribute level; and a model explorer module comprising a model explorer user interface for allowing the user to enter one or more attribute levels and obtain a model prediction of the expected utility.

According to a second aspect of the present invention, there is provided an apparatus for performing an online choice model, the apparatus comprising:

a problem definition module comprising a problem definition user interface for receiving a plurality of attributes from a user wherein each attribute has an associated plurality of attribute levels;

an online choice model survey module comprising:

an experimental design generator module for generating a survey experimental design and an associated plurality of treatments, comprising a library of experimental designs, wherein the experimental design generator module determines the signature of the attribute space from the received plurality of attributes and associated attribute levels and for one or more experimental designs in the library of experimental designs, performs one or more transformations until the signature of the transformed experimental design matches the signature of the attribute space to obtain one or more matching transformed experimental designs, and selecting the survey experimental design from the one or more matching transformed experimental designs, and obtaining a set of treatments from the selected survey experimental design an online survey assembly module which receives the plurality of treatments and assembles an online survey from one or more survey templates pages, and a plurality of treatment representations created using the plurality of treatments received from the experimental design module;

a data collection and sampling module for conducting the assembled online survey, wherein the data collection and sampling module allocates treatments to survey respondents and collects responses using the assembled online survey;

a model generation module for receiving the data collected by the data collection and sampling module and building a model to obtain a plurality of model parameter estimates and errors from which a utility estimate can be obtained for each attribute level; and a model explorer module comprising a model explorer user interface for allowing the user to enter one or more attribute levels and obtain a model prediction of the expected utility.

According to a third aspect of the present invention, there is provided a method for computationally performing an online choice model, the method comprising:

receiving a plurality of attributes from a user wherein each attribute has an associated plurality of attribute levels;

generating a survey experimental design and an associated set of treatments, comprising the steps of:

determining the signature of the attribute space from the received plurality of attributes and associated attribute levels;

selecting one or more experimental designs from a library of experimental designs;

for each selected experimental design, performing one or more transformations until the signature of the transformed experimental design matches the signature of the attribute space to obtain one or more matching transformed experimental designs;

selecting a survey experimental design from the one or more matching transformed experimental designs, and obtaining a set of treatments from the selected survey experimental design;

assembling an online survey, comprising the steps of:

creating a plurality of survey templates pages;

creating a plurality of treatment representations based on the set of treatments associated with the survey experimental design;

assembling the plurality of survey templates pages and plurality of treatment representations to form an online survey;

conducting an online survey, the online survey comprising allocating each treatment to one or more respondents;

providing a plurality of combinations of treatments to the one or more respondents;

receiving the responses of the one or more respondents;

generating a model based upon the received responses to obtain a plurality of model parameter estimates and errors from which a utility estimate can be obtained for each attribute level; and providing a model explorer user interface for allowing the user to enter one or more attribute levels and obtain a model prediction of the expected utility.

According to a fourth aspect of the present invention, there is provided a method for generating a survey experimental design and an associated set of treatments for use in an online choice model, comprising the steps of:

determining the signature of the attribute space from the received plurality of attributes and associated attribute levels;

selecting one or more experimental designs from a library of experimental designs;

for each selected experimental design, performing one or more transformations until the signature of the transformed experimental design matches the signature of the attribute space to obtain one or more matching transformed experimental designs;

selecting a survey experimental design from the one or more matching transformed experimental designs, and obtaining a set of treatments from the selected survey experimental design.

According to a fifth aspect of the present invention, there is provided a method for allocating a treatment to a survey respondent from a set of treatments in an online choice model survey, comprising the steps of:

receiving a set of treatments for use in an online choice model survey;

initialising an allocation frequency counter for each treatment in the set of treatments;

receiving a request for a treatment to be provided to a survey respondent; and allocating a treatment to a survey respondent from the set of treatments, wherein the allocated treatment is selected from the subset of treatments which have not previously been allocated to the survey respondent and whose allocation frequency differs by no more than a predefined maximum difference amount from the most allocated treatment in the set of treatments.

According to a sixth aspect of the present invention, there is provided a method for creating an online choice model survey, the method comprising:

receiving a set of treatments for use in an online choice model survey, wherein the online choice model survey has an associated attribute space and each treatment corresponds to a unique combination of attribute levels in the associated attribute space;

providing a user interface for receiving content and layout parameters relating to the online choice model survey from a user;

generating a plurality of survey template pages based on the content and layout parameters received from the user, wherein at least one of the plurality of survey template pages comprises at least one treatment display zone, each treatment display zone comprising one or more associated layout parameters;

sending the set of treatments and the one or more layout parameters associated with each treatment zone to a content generator for generating a visual representation of a treatment; and receiving a plurality of treatment representations from the content generator, wherein in use, an online choice model survey is provided to a survey respondent comprising one or more web pages based upon the one or more survey template pages in which each of the treatment display zones displays one of the received visual representations of a treatment.

According to a seventh aspect of the present invention, there is provided a method for providing a user interface for use in an online choice model, the method comprising:

providing an attribute input user interface for receiving a plurality of attributes from a user for use in for the online choice model, comprising:

one or more attribute zones wherein each attribute zone receives an attribute and a plurality of attribute levels associated with the attribute from the user; and providing model exploration user interface for allowing a user to explore an online choice model created using the plurality of attributes received from the attribute input user interface, comprising:

an attribute level selection zone for each attribute in the choice model, wherein each attribute level selection zone allows a user to select one of the associated levels;

a prediction output zone which displays an estimate of the predicted response and variability estimate from the online choice model for the current attribute levels selected in the attribute level selection zone.

According to a seventh aspect of the present invention, there is provided a computer readable medium, comprising computer executable instructions for causing a processor to perform a method comprising:

receiving a plurality of attributes from a user wherein each attribute has an associated plurality of attribute levels;

generating a survey experimental design and an associated set of treatments, comprising the steps of:

determining the signature of the attribute space from the received plurality of attributes and associated attribute levels;

selecting one or more experimental designs from a library of experimental designs;

for each selected experimental design, performing one or more transformations until the signature of the transformed experimental design matches the signature of the attribute space to obtain one or more matching transformed experimental designs;

selecting a survey experimental design from the one or more matching transformed experimental designs, and obtaining a set of treatments from the selected survey experimental design;

assembling an online survey, comprising the steps of:

creating a plurality of survey templates pages;

creating a plurality of treatment representations based on the set of treatments associated with the survey experimental design;

assembling the plurality of survey templates pages and plurality of treatment representations to form an online survey;

conducting an online survey, the online survey comprising allocating each treatment to one or more respondents;

providing a plurality of combinations of treatments to the one or more respondents;

receiving the responses of the one or more respondents;

generating a model based upon the received responses to obtain a plurality of model parameter estimates and errors from which a utility estimate can be obtained for each attribute level; and providing a model explorer user interface for allowing the user to enter one or more attribute levels and obtain a model prediction of the expected utility.

BRIEF DESCRIPTION OF THE DRAWINGS

An illustrative embodiment of the present invention will be discussed with reference to the accompanying figures wherein:

FIG. 11 illustrates the most preferred (left) and least preferred (right) magazine covers based upon the model illustrated in FIG. 10;

FIG. 12 is a flowchart of a method for generating an experimental design for use in an online survey according to an embodiment of the present invention;

In the following description, like reference characters designate like or corresponding parts throughout the related figures.

DESCRIPTION OF ILLUSTRATIVE EMBODIMENTS

Figure 1:
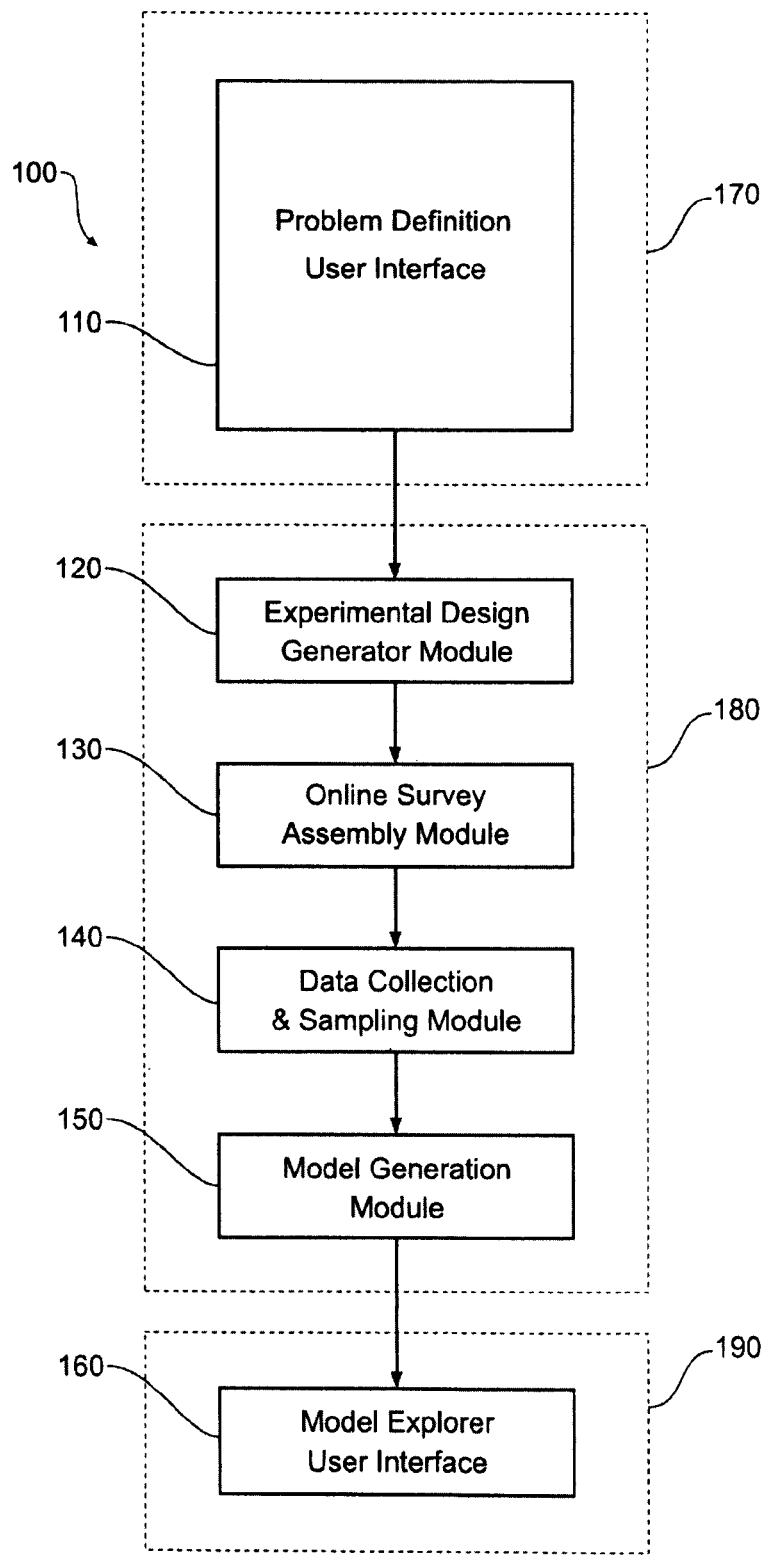
FIG. 1 is a block diagram of system for performing an online choice experiment according to an embodiment of the present invention.

Choice experiments, or choice modelling (the two terms will be used interchangeably) includes presenting hypothetical products (choices) to survey respondents, and forces them to make a choice by performing a trade-off between the combinations of features included in each alternative under consideration. Choice experiments can be used to efficiently cover a very large numbers of product configurations in a way that maximises information collection with an appropriate choice of the experimental design. Further the approach allows construction of a statistical (choice) model and estimation of associated parameters to allow exploration of the large numbers of possible product configurations.

Choice modelling can potentially be used to produce hard numerical predictions of specific outcomes. The predictions can be both highly accurate predictions—with predictions typically within 1 percent of actual values, as well as being able to produce valid predictions over very large possible combinations. Further it may allow identification of independent contributing factors in understanding choices.

Choice modelling can potentially be used in a wide variety of cases to assist decision makers in what particular path to pursue. For example a product manager may wish what options to bundle with a product in order to maximise sales, or a financial institution may be interested in how to maximise revenue from an existing credit card product without losing its market share. Alternatively politicians, or policy makers may be interested in the reaction of the public (or a particular segment) to possible changes in policy or new policies. A choice model can also allow more sophisticated 'wargaming' strategies to be formulated where the optimal proposition may found that is the easiest to defend regardless of competitor changes.

To assist in understanding of the invention, a number of terms will now be defined:

[1] The System: the methods, and associated computer code, hardware and network for implementing the methods described herein;
[2] Treatment: a specific instantiation of one of the combinations of Attribute Levels;
[3] Attribute: an independent variable describing one aspect of phenomena such as a product or a service or an environment under investigation;
[4] Attribute Levels: for an Attribute [3] the discrete values that the Attribute can take on;
[5] Attribute Space: the multidimensional mathematical space corresponding to every possible combination of Attribute Levels [4] for a set of Attributes [3];
[6] Experimental Design: a set of Treatments comprising a non empty subset or whole of the Attribute Space [5];
[7] Attribute Space Signature: a concatenation of all of the number of Attribute Levels [4] in the Attribute Space [5] describing the size, dimensionality and information requirements for exploring the Attribute Space [5];
[8] Sampling Deck: a vector describing the current state of sampling allocations of set elements from a set;
[9] Blocking: a sampling constraint on an Experimental Design whereby respondents are consistently allocated to treatments [2] from the same subset of the Experimental Design;
[10] Dependent Variable: a variable describing the effect component of the cause and effect relationship in a process;
[11] Independent Variable: a variable describing the cause component of the cause and effect relationship in a process;
[12] Utility: the natural log of the marginal probability contributing to an outcome interpreted as a measure of the relative satisfaction from;
[13] Simulation: the process of using system agents to mimic the behaviour of real agents;
[14] Investigator or End User: the individual actively using the system [1] to create experiments [17], collect and analyse data;
[15] Subject or Respondent: the entity under experimentation, generally a human being respondent but also including but not limited to an organisation, a group, a process, a living organism or any agent exhibiting behaviour as a response to it's environment;
[16] Scenario: a specific set of treatments [2] from an Experiment [17];
[17] Experiment: investigation of a cause and effect relationship through asystematic presentation of Scenarios [16] to Subjects [15] according to an experimental design [6] and the recording of Dependent variables [10];
[18] Model: a mathematical description of a real world process;
[19] Model form: a specific mathematical function implementing a Model [18] that relates the input independent variables [11] to the output dependent variables [10];
[20] Model Parameter Estimates: numerical components of the Model [18] when applied to the Model Form [19] produce Model Predictions [21];
[21] Model Predictions: specific numerical estimations of the probability that an event would occur:
[22] Model Explorer: a software application embodying a Model [18] allowing the input of causal independent variables [11] and the calculation and display of model predictions [21];
[23] Product/Service: Generic terms for the item under investigation including a product, service, policy, electoral candidate, advertisement, job offer, etc, that a respondent may choose to buy, use, hire, or otherwise be interested in;
[24] Choice: The act of selecting one alternative product/service over another or none.

FIG. 1 is a block diagram of a system 100 for performing an online choice experiment (also referred to as choice model) according to an embodiment of the present invention. The system comprises problem definition module 170, a choice model online survey module 180, and a model explorer module 190. In a choice experiment, the user, also referred to as the investigator who is typically a non expert lay person, is interested in determining the response of a target audience (represented by survey respondents) to a specific question, such as which phone would you buy. A survey is conducted in which each respondent is provided a choice of two products (e.g. phones) and must select one (or none). In this case the experiment question is the dependent variable from which the model will be generated. Once a model is generated the results may be explored and used to make decisions.

The problem definition module 170 comprises a problem definition user interface 110 which allows a user to define or enter the scope of the problem they wish to study. This includes specifying the problem or question to be asked, the attribute space in terms of attributes and associated levels along with sample characteristics such as sample size, accuracy (e.g. % error), desired market segments, and any related information for performing a choice experiment such as the choice text or options. The choice model online survey module 180 constructs, performs and analyses, the actual survey (choice experiment) and comprises an Experimental Design Generator Module 120, an Online Survey Assembly Module 130, a Data Collection and Sampling Module 140 and a Model Generation Module 150. The Choice Modelling Online Survey Module 180 may be a back end (server or cloud based) system relative to the investigator. In some embodiment the investigator is involved in, or reviews and approves the various stages such as survey generation, survey publishing, and data collection. This may be done in conjunction with other parties such as graphic designers or consultants via one or more user interfaces. The model explorer module 180 comprises a model explorer user interface 190 to allow the user (investigator) to explore the model and obtain estimates of the likely effect (e.g. changes in utility, or market share) of various combinations of features (treatments). The various user interfaces (eg problem definition, survey generation, model exploration, etc) may be provided through a common portal, such as a webpage, mobile phone or tablet "app", etc, with authenticated logins to provide different levels of access to a specific survey, or multiple surveys. For example a survey investigator can create and manage a survey, and survey respondents may only be allowed to answer questions in relation to surveys.

Figure 2:
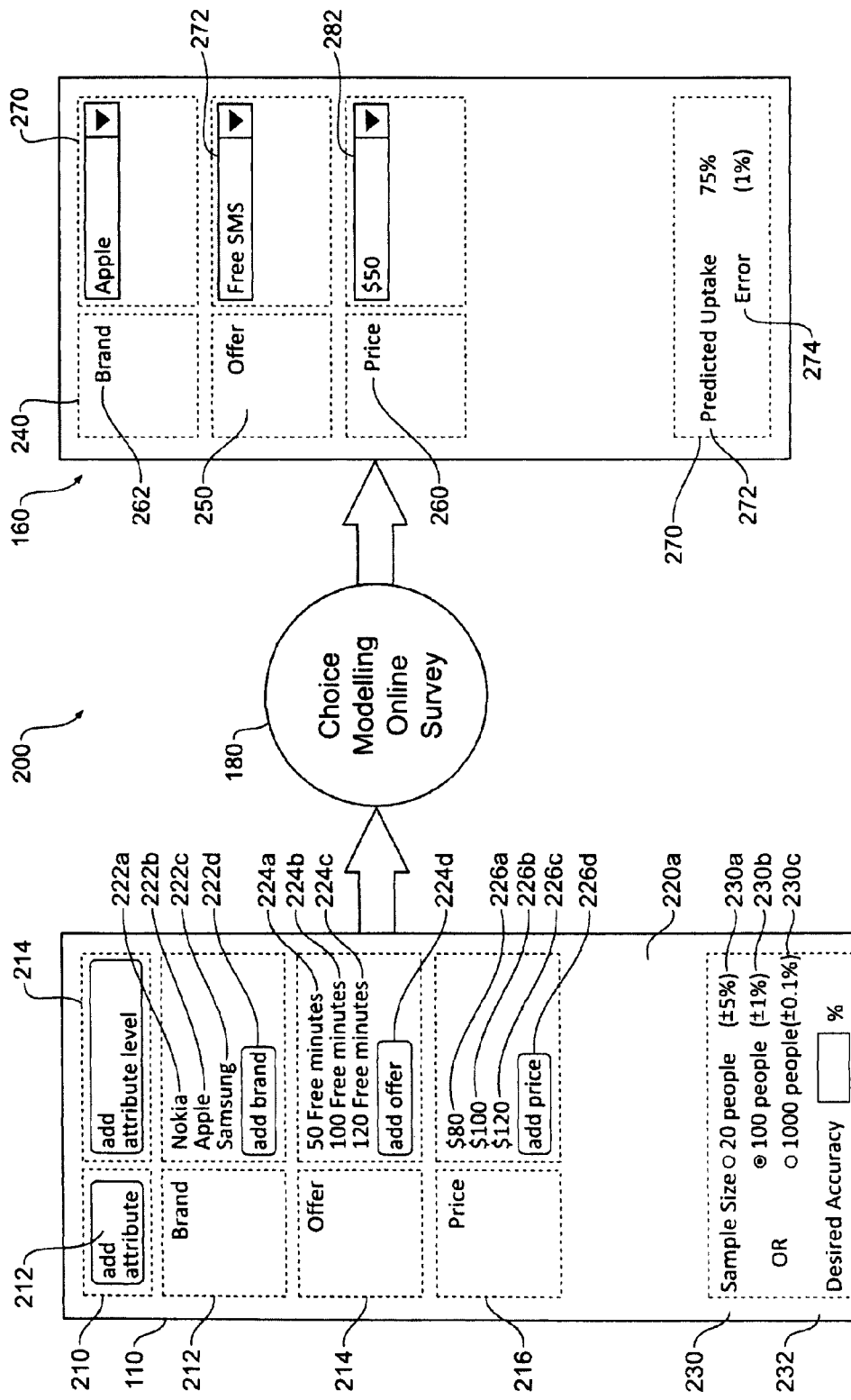
FIG. 2 is a schematic overview of system for performing a choice experiment according to an embodiment of the present invention.

In order to assist with the understanding of the invention an example study will be described in which the end user is a product manager for a telecommunications company who wishes to determine the what range of mobile phone plans to offer potential buyers, as well as and how much the potential buyers are willing to pay in order to set price points which will maximise revenue. FIG. 2 is a schematic overview of system 200 for performing a choice model based online survey according to an embodiment of the present invention. The system includes a problem definition user interface 110, a choice modelling online survey module 180, and a model explorer user interface 160.

The problem definition user interface 110 is provided to allow the investigator to define the type of choice experiment and the associated attribute space to be investigated, in the form of a set of attributes and associated attribute levels. An attribute is an independent variable describing one aspect of a phenomenon such as a product or a service or an environment under investigation. For example in relation to a mobile phone it might be price, colour, form factor or warranty, and for a credit card it might be interest rate, number of interest free days, benefits or annual fees. Each of the attributes has a number of associated values called attribute levels. Attribute levels represent plausible but not necessary probable values that a given attribute could take. For example if the current price of a product is $99, the investigator may decide to include prices above and below for exploration such as $89, $79, $109 and $119.

The attributes and attributes levels describe a multidimensional Attribute Space comprising all possible combinations of attribute levels. This space may be characterised by a unique signature, formed by the multiplicative product of the number of levels for each attribute. For example consider the following attribute space for a mobile phone
Price: 3 levels ($89.99, $79.99, $109.99 and $119.99)
Colour: 4 levels (Black, White, Red, Silver)
Form Factor: 4 levels (bar, clam, slide, swivel)
Warranty: 5 levels (none, 6 months, 12 months, 18 months, 2 years)

In the above example, the signature is 3×4×4×5, or 3×4$^2$×5. This signature is an abstract yet complete and concise way of describing the information requirements of exploration of the Attribute space, for example, the numerical product of the signature is equal to the total number of unique combinations that could be generated from the provided attributes (i.e. 3×4$^2$×5=240 possible combinations). Each of the possible combinations is referred to as a treatment.

Figure 3:
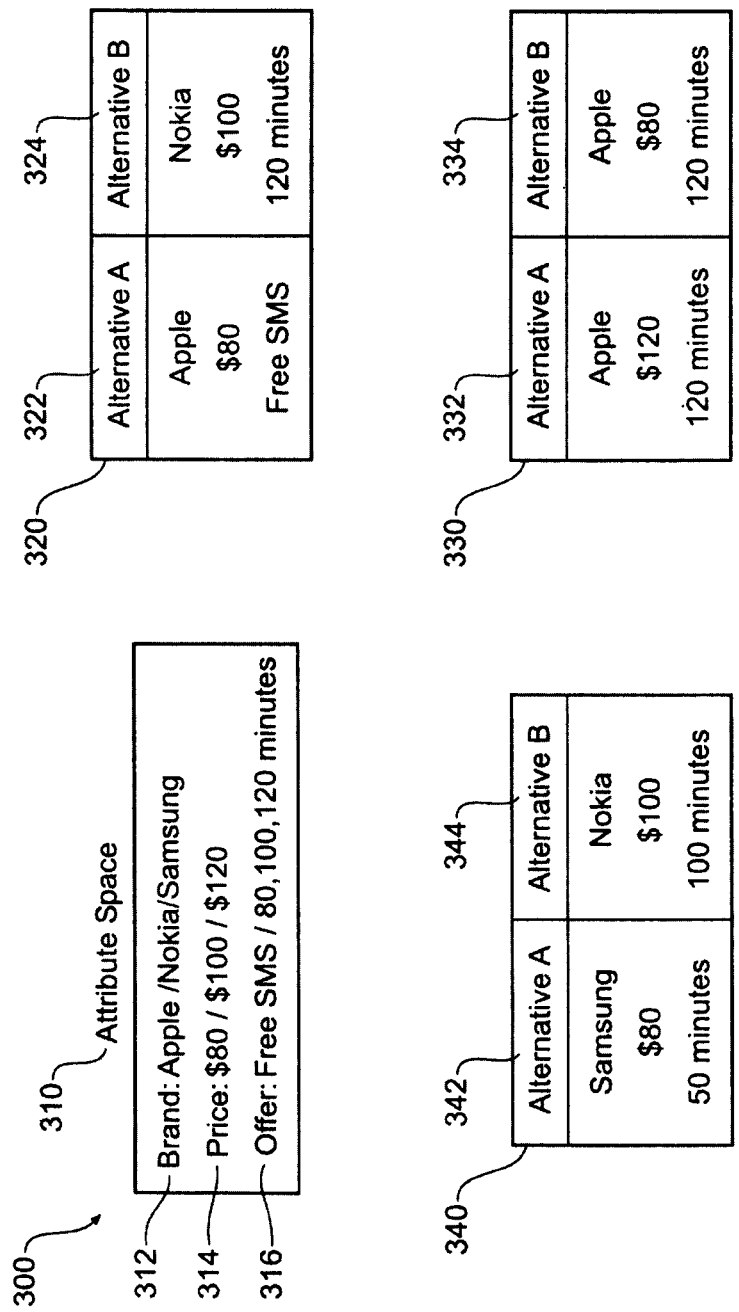
FIG. 3 shows an attribute space and representative scenarios and treatments according to an embodiment of the present invention.

FIG. 3 is a representation of a user specified attribute space 300. In this case the attribute space 310 includes attributes Brand 312 with three levels, Price with three levels 314 and Offer with 4 levels 316, defining an attribute space with signature 3×3×4, and 36 possible treatments. In a choice experiment a respondent is presented with one or more scenarios, each scenario containing representations of two treatments for consideration. In FIG. 3, three scenarios 320, 330 and 340 are shown, with each scenario including a treatment labelled "Alternative A" and "Alternative B", with each alternative corresponding to a different treatment. In one embodiment, in order to maximise information collection, respondents are asked the same question in relation to different scenarios. Preferably each respondent never sees the same treatment twice. For example scenarios 320, 330 and 340 each represent different choices sequentially offered to a single respondent. In each case the respondent is forced to trade off between the different options and make a selection. For example a first respondent may have a preference for free SMS's and thus may choose Alternative A 322 in the first scenario 320, Alternative A 332 in the second scenario 330, and Alternative A 342 in the third scenario 340. Another respondent with a preference for Nokia phones may select Alternative B 324 in the first scenario 320, Alternative B 334 in the second scenario 330 on the basis of lower cost, and Alternative B 344 in the third scenario 340.

As discussed the problem definition user interface also allows the user to input and manage a range of different choice experiment types. Whilst the choice modelling system described herein is agnostic to the specific choice experiment type, to assist the user, the user interface allows the user to choose specific types such as Best/Worst (MaxDiff), Paired Comparison and Alternative Specific. For example they user could be provided with a page which asks them the type of experiment they would like to conduct, or allow them to select a generic or custom experiment. This allows the user to focus on solving a particular type of prediction problem, alternatively they can simply enter information and the system can determine the appropriate model and design to use based on the supplied information.

The Best/Worst case can be used when it is desirable to simple predicting the probability one item would be chosen over another. Whilst other approaches can be used for such simple "atomic" queries (ie atom vs atom comparison), Best/Worst (MaxDiff) modelling typically uses smaller sample sizes, produces more accurate estimates, and also the ability to estimate the magnitude of the effect rather than just the order of preference. Typical questions are what is the best film to show at a festival, or what ice cream flavours to offer at a shop, or what are the best 5 features from a set of 25 features to highlight in marketing material. A relatively simple user interface can be provided in which the user enters the question they wish to present to survey respondents in a box with a label such as "Enter the question text", and a further box with a label "List the items you want to Predict" in which they can list the items. For example the user may enter the question is "Which Film to you prefer", and the film titles "Real Steel", "The Cup", "Footloose" and "Johnny English" can be provided.

Paired comparison choice experiments are typically used when it is desirable to predict the choice of one configuration of attributes over another configuration of attributes where the underlying configuration set is always the same. That is you want to optimise a single product or service independently of the outside market (ie what are the best set of features to include a single product, or how to optimise a magazine layout). In this approach the user interface allows the user to enter the question, along with a plurality of attributes, and attribute levels for each attribute. The example discussed above and illustrated in FIGS. 2 and 3 illustrate a paired comparison experiment.

Alternative specific choice experiments are used when it is desirable to predict the choice of one alternatives configuration over another—where each alternative could contain specific elements not in other configurations (eg different attributes and/or levels). For example a user may wish to predict how people will travel to work given a number of alternatives such as bus, bike, car, or train. Each alternative may share some similar attributes such as travel time and cost, but not others such as waiting time, relevant to public transport such as buses and trains, or car toll for cars. The user interface would allow users to add attributes and add alternatives. This is typically the most generic case and in one embodiment is used as the custom experiment option.

The problem definition user interface 110 may further allow the user to define or specify constraints (or criteria) such as the required accuracy which may be a percentage error or a significance cut off (eg 0.05), a specific sample size or both. Other constraints such as survey budget, desired market segments, entry requirements etc which influences the size of the survey may also be obtained from the user. The user may also provide other related information such as the question to be asked, images to be used, etc.

The problem definition user interface 110 includes an attribute zone 210 for receiving an attribute and a plurality of attribute levels associated with the attribute from the user. The attribute zone may include an "add attribute" input means 212 such as clickable button, icon, keyboard shortcut or menu item to allow the investigator to add an attribute associated with their problem. For each added attribute an associated "add attribute level" input means 214 is provided to allow the investigator to add the number of levels associated with each attribute. In this way, an investigator can add as many attributes as desired, and for each attribute, add as many attribute levels as desired. In one embodiment each time an attribute is added, the label of the associated "add attribute level" is modified to "add [Attribute name]".

In this example the product manager has added 3 attributes—the brand 222, offer 224, and price 226. The product manager and has further added 3 brands: Nokia 222a, Apple 222b, and Samsung 222c via the "add brand" button 222d; 4 offers: Free SMS, 50 free minutes, 100 free minutes or 120 free minutes via the "add offer" button; and 3 prices: $80 226a, $100 226b, and $120 226c via the "add price" button 226d. This has created three attribute zones 212, 214 and 216—one for each attribute to be investigated.

Additionally the investigator may be provided with an option of indicating the desired sample size 230, such as 20 people 230a, 100 people 230b or 1000 people 230c. Alternatively, an input field could be provided to allow the investigator to enter the desired accuracy 232. Additional information may be associated with each choice. For example the accuracy and/or likely cost associated with each sample size or choice of desired accuracy. This information for the current attribute space could be obtained by performing a simulation, or via consultation with a lookup table or other reference data contained or accessible by the system 200. The user interface may also allow the investigator to specify other constraints such as the survey budget, desired market segments, etc which influence the size of the survey and entry requirements for survey respondents.

Once the investigator has defined the problem in terms of attributes, attribute levels, and optionally input the desired accuracy and other relevant information, the problem definition is provided to the Choice Modelling Online Survey Module 180 which is used to generate a model for use by the model explorer Module 190. The user interface may also allow the investigator to be involved in this process, such as by assisting in generation of survey format, content and templates, or reviewing aspects such as experimental design and the treatment representations as will be discussed below. Once the survey is performed and a model is generated, the investigator is then presented with the model explorer user interface 160 in order to explore the model.

Following problem definition, an appropriate experimental design must be selected for a choice experiment by the choice model online survey module 180. An experimental design is a systematic plan for executing a controlled experiment. The experimental design is a subset of the entire attribute space with usually far fewer unique treatments than the complete attribute space. The creation of a design is intimately related to the attribute space under examination and the model form that is hypothesised to explain the phenomena under examination (through estimation of model parameters). Typically the attribute space is obtained from the problem definition (eg signature), but for a given attribute space there may be various appropriate experimental designs and models which may be used to obtain estimates of the model parameters (eg coefficients $\beta$). For a given design, different models vary in how they perform estimation of model parameters and their variance, and thus different models have different strengths and weaknesses.

Ideally the experiment design contains just enough variation for a statistical model to be generated that can be used to produce estimates for the complete attribute space. Efficient designs are typically those designs which provide accurate estimates of model parameters whilst minimising the number of treatments utilised or the total number of survey respondents to achieve a desired accuracy or confidence level. That is they are efficient (or optimal) in terms of the number of surveys and/or the length of the survey for a given minimum accuracy or confidence level.

A discrete choice model specifies the probability that a person chooses a particular alternative, with the probability expressed as a function of observed variables that relate to the alternatives and the person. In its general form, the probability that person n chooses alternative i is expressed as:

$$P_{ni} = \text{Prob}(\text{Person } n \text{ chooses Alternative } i) = G(x_{ni}, x_{nj} \forall i \neq j, s_n, \beta)$$

where $x_{ni}$ is a vector of attributes of alternative i faced by person n, $x_{nj} \forall i \neq j$ is a vector of attributes of the other alternatives (other than i) faced by person n, $s_n$ is a vector of characteristics of person n, and β is a set of parameters that relate variables to probabilities, which are estimated statistically.

Current popular model forms for estimating choice model parameters ( ) include the Generalised Extreme Value (GEV) logit form for which the hypothesis is that the decision rule people use when choosing among alternatives they seek to maximise their total utility and that that utility is linearly additive. The general form of the GEV logit model is $$U_{ni} = \beta z_{ni} + \epsilon_{ni}$$

where $U_{ni}$ is the utility (net benefit) that person n obtains from alternative i, $z_{ni}$ is, is a vector of observed variables relating to alternative i for person n that depends on attributes of the alternative, $x_{ni}$, interacted perhaps with attributes of the person, $s_n$, such that it can be expressed as $z_n = z(x_{ni}, s_n)$ for some numerical function z: β is s a corresponding vector of coefficients of the observed variables (the model coefficients or parameter estimates); and $\epsilon_{ni}$ captures the impact of all unobserved factors that affect the person's choice (ie the error) The GEV logit model allows correlation in unobserved factors across alternatives, is individually, the extreme value unobserved factors are independent and identically distributed (iid; a random variable has the same probability distribution as the others and all are mutually independent), the cumulative distribution of difference in extreme values is a Logistics function, and the Logistics function has a closed form solution. Other model forms may also be used. These include various Logit forms such as Binary Logit, Multinomial Logit, Conditional Logit, Nested Logit, Mixed Logit, Exploded Logit; various Probit forms such as Binary Probit and Multinomial Probit, Cox Regression, Generalized Extreme Value Models, Bayesian Models, and the EBA (elimination by aspect), where when faced with very large numbers of competing choices they simply eliminate alternatives based on a single aspect rather than compare each in detail. For an overview of possible model see http://en.wikipedia.org/wiki/Discrete_choice and the references included therein. Even more can be imagined for which there exist no model form—for example complex if—then rules.

The Experimental. Design Generator Module 120 is used to generate a survey experimental design, and an associated set of treatments for use in the choice model online survey module 180 based upon the user defined problem or experiment specification obtained via problem definition user interface 1210. A method 1200 for generating a survey experimental design for use in an online survey as illustrated in FIG. 12. The experimental design generator module (referred to as the design generator) receives the plurality of attributes, and associated levels from the problem definition user interface 1210. The design generator then determines the signature, or required dimensionality of an experimental design matrix, based upon the received attributes and attribute levels 1220 (the terms signature and dimensionality will be used interchangeably). The experimental design generator module also comprises (or is operatively connected to) a library of experimental designs (this may be in the form of a database, set of data structures, one or more configuration files etc) from which one or more candidate designs are generated. In one embodiment each experimental designs is a matrix with an associated dimensionality or signature. The library may be seeded with one or more base or default designs. Each base design in the library is associated with a particular statistical model and has a predetermined or known dimensionality. For example suitable base designs include latin square designs, balanced incomplete designs, random designs including randomised block designs, main effects designs, two way effects, full factorial designs, combinatorial designs etc. As new designs are generated they may be added to the library, along with any associated information for future use by the system.

Returning to the method, one or more experimental designs are selected from the library of experimental designs 1230. In the case that a design exists within the library in which the dimensionality or signature of the design matches the determined (ie user specified) signature or dimensionality then such a design can be selected. More typically the library will lack a matching experimental design, and a suitable design will need to be generated. This can be randomly selected, or a set of base designs appropriate for the currently chosen choice model form (eg Best/Worst, Paired or alternative specific) may be predefined and selected. Then, at step 1440, for each selected experimental design, one or more transformations is performed on the experimental design matrix until the design is transformed (or adjusted) until the signature of the transformed experimental design matches the signature of the attribute space. In addition to performing this on each selected design, this transformation may be done for repeatedly for each selected design. At the end of this step one or more matching transformed experimental designs is obtained. In one embodiment these transformation is performed in such a way that the information properties of the starting design is preserved. That is the structure of the factor combinations or treatments in the starting design from the library is maintained or preserved. This ensures that irrespective of the model form that the starting (or parent) design was suited to, the resultant design retain the information properties of their parent design but fit the current user specified attribute space. Then at step 1250 a survey experimental design is selected from the one or more matching transformed experimental designs, and a set of treatments obtained from the selected survey experimental design.

Transforming an experimental design may be performed as follows. The experimental design is represented as a matrix in which the columns correspond to attributes, referred to as factors, and the rows represent treatments (a specific combinations of attribute levels). Firstly, each selected design from the library is placed in a queue of candidate designs, and each candidate design is removed from the queue and then a search is made for a suitable transformation or set of transformation to obtain the desired target (user defined) signature. This is performed by applying, for each factor (attribute) F in the candidate design, one or more of the following transformation steps:

factorial splitting of a factor F into two sub factors A, B where A×B=F and A or B match at least one unmatched factor in the signature;

factorial expansion of a factor F into a new factor A×F where A×F matches at least one unmatched factor in the signature;

factor truncation of a factor F into a new factor F−A where F−A matches at least one unmatched factor in the signature;

full factorisation by generation of a new factor F where F matches at least one unmatched factor in the signature; and deleting a factor F when all the other factors in the signature are matched.

This transformation approach provides a method for generation of any target design (ie required signature) from any starting or base design (including none). Further the information properties are preserved at each transformation step design (i.e. the structure of the factor combinations or treatments is maintained). This approach advantageously allows the system to be used with a wide range of problem specifications, and most importantly, with the problem specification proposed by the user, rather than attempting to modify the users attributes, such as by deleting or adding dummy attributes and levels, in order to match a known (but non matching) design. Further this approach allows the system to be agnostic to the type (or form) of model used, and thus any appropriate model (eg GEV Logit, EBA, etc) may be used. In come cases a proposed attribute space or a selected design may not produce a viable model—for any number of observations. In this case the system can alert the investigator that the experiment is not viable.

In one embodiment, the selection process stops as soon as a matching design is generated. In another embodiment, a plurality of matching designs are generated from one or more designs in the library, and simulations are performed to estimate the performance characteristics of each matching design, such as accuracy and/or precision (i.e. statistical power), and the dependence of such characteristics on sample size. The predictive accuracy of each design can be estimated for a range of different sample sizes through the use of simulation or optimisation techniques such as Monte Carlo based techniques, genetic algorithms, simulated annealing, bootstrapping, test/training sets etc. For example a dataset corresponding to an attribute space with known values (utilities) could be generated and then sampled using a sample size of interest. A model could then be estimated using the design and test sample size and the model estimates (utilities) compared against the known values. This approach can be repeated for each sample size, and again for a range of sample sizes to enable the predicted accuracy of the design to be estimated for a range of sample sizes. Once this has been performed for a range of different designs, the optimal design can be selected based on the design with performance characteristics that best satisfies some criterion or criteria, which may be predefined or user defined, and comprises criterion such as a minimum or maximum number of samples, an acceptable range of samples, low bias, low variance, computational complexity, inclusion or exclusion of interaction or cross effects, etc. For example optimal design criteria may be one that requires the least number of samples, or the least number of samples with the lowest variance. The selection criteria used may be predefined or user defined via the problem definition user interface, alternatively the end user can be offered a choice of designs and their characteristics and the user can select the design to use (the survey experimental design). Once a survey experimental design is selected the set of treatments associated with this experimental design can be provided to the Online Survey Assembly Module 130. As new designs are created they can be added to the library or database of experimental designs.

An example of design generation including factorial expansion and factor truncation is illustrated in Table 1. In this example the target design is for a choice experiment relating to preferences for a phone handset having the following attribute space: Colour: black, white; Shape: candybar, flip, swivel; and Price: $50, $60, $70, $80. The target design can be described by the attribute space 2×3×4. Taking the starting base design 2^3 (or 2×2×2) as a starting point, the source 2×2×2 can transformed into the target 2×3×4 through the following steps illustrated in Table 1.

TABLE 1 transformation of a 2 × 2 × 2 design matrix to a target 2 × 3 × 4 design matrix

| Step | Detail | Design Signature | Design Matrix | Design Rows |
|---|---|---|---|---|
| 1 | Select design from library (Exact match column 1) | 2 × 2 × 2 | 0 0 1<br>0 1 0<br>1 0 0<br>1 1 1 | 4 |

TABLE 1-continued transformation of a 2 × 2 × 2 design matrix to a target 2 × 3 × 4 design matrix

| Step | Detail | Design Signature | Design Matrix | Design Rows |
|---|---|---|---|---|
| 3 | Factorial expansion of column 2 to 4 levels | 2 × 4 × 2 | 0 0 1<br>0 1 0<br>1 0 0<br>1 1 1<br>0 2 1<br>0 3 0<br>1 2 0<br>1 3 1 | 8 |
| 4 | Fill/Truncate Column 2 to 3 levels (Exact match column 2) | 2 × 3 × 2 | 0 0 1<br>0 1 0<br>1 0 0<br>1 1 1<br>0 2 1<br>0 2 0<br>1 2 0<br>1 2 1 | 8 |
| 5 | Factorial expansion column 3 to 4 levels (exact match column 3) | 2 × 3 × 4 | 0 0 1<br>0 1 0<br>1 0 0<br>1 1 1<br>0 2 1<br>0 2 0<br>1 2 0<br>1 2 1<br>0 0 3<br>0 1 2<br>1 0 2<br>1 1 3<br>0 2 3<br>0 2 2<br>1 2 2<br>1 2 3 | 16 |
| 6. | Matched Design - end | | | |

Another example of design generation including Factorial Splitting, Full Factorisation and Column Dropping, is illustrated in Table 2. In this example the target design is for a choice experiment relating to preferences for a phone handset having the following attribute space: Colour: black, white; Shape: candy bar, flip; and Price: $50, $60, $70 The target design can be described by the attribute space 2×2×3. Assuming our library only contains the starting base design 4×2, then the source 4×2 can transformed into the target 2×2×3 through the following steps illustrated in Table 2.

TABLE 2 transformation of a 4 × 2 design matrix to a target 2 × 2 × 3 design matrix

| Step | Detail | Design Signature | Design Matrix | Design Rows |
|---|---|---|---|---|
| 1 | Select design from library | 4 × 2 | 0 0<br>0 1<br>1 0<br>1 1<br>2 0<br>2 1<br>3 0<br>3 1 | 8 |
| 3 | Factorial split of column 1 into 2 columns of 2 levels (exact match columns 1 and 2) | 2 × 2 × 2 | 0 0 0<br>0 0 1<br>0 1 0<br>0 1 1<br>1 0 0<br>1 0 1<br>1 1 0<br>1 1 1 | 8 |

TABLE 2-continued transformation of a 4 × 2 design matrix to a target 2 × 2 × 3 design matrix

| Step | Detail | Design Signature | Design Matrix | Design Rows |
|---|---|---|---|---|
| 4 | Add full factorisation column 4 of 3 levels: replicate the design 3 times with a +1 offset for each replication. (exact match column 4) | 2 × 2 × 2 × 3 | 0 0 0 0<br>0 0 1 0<br>0 1 0 0<br>0 1 1 0<br>1 0 0 0<br>1 0 1 0<br>1 1 0 0<br>1 1 1 0<br>0 0 0 1<br>0 0 1 1<br>0 1 0 1<br>0 1 1 1<br>1 0 0 1<br>1 0 1 1<br>1 1 0 1<br>1 1 1 1<br>0 0 0 2<br>0 0 1 2<br>0 1 0 2<br>0 1 1 2<br>1 0 0 2<br>1 0 1 2<br>1 1 0 2<br>1 1 1 2 | 24 |
| 5 | Ignore column 3 | 2 × 2 × 3 | 0 0 0<br>0 0 0<br>0 1 0<br>0 1 0<br>1 0 0<br>1 0 0<br>1 1 0<br>1 1 0<br>0 0 1<br>0 0 1<br>0 1 1<br>0 1 1<br>1 0 1<br>1 0 1<br>1 1 1<br>1 1 1<br>0 0 2<br>0 0 2<br>0 1 2<br>0 1 2<br>1 0 2<br>1 0 2<br>1 1 2<br>1 1 2 | 24 |
| 6. | Matched Design - end | | | |

Once an experimental design has been selected the set of experiment scenarios and treatments to be used in the survey can be determined. In one embodiment each scenario is a single treatment with the choice of choosing or not choosing the offered treatment, in other embodiments the scenario is a combination of two treatments and in other embodiments, the scenario may comprise three or more treatments displayed to the user. An Online Survey Assembly Module 130 can then be used to prepare an online survey tool. This involves creating an introduction page, some instructions and one or more experiment scenario placeholders from which multiple (different) surveys may be built for sending out to respondents. The scenario or treatment placeholders are elements which define where a visual representation of a treatment will be placed when the online survey is performed. By incorporating generic treatment placeholders into the template pages for use in the survey, an online survey can be efficiently prepared either automatically, or by the end user without having to be overly concerned with the details of exact treatments to be offered, or the final visual appearance of any of the treatments to be tested. Instead the task of generating the content user to represent a treatment to be displayed to a survey respondent can be outsourced to a graphic designer or performed computationally using a content library or other information sources based on the specific treatment. This provides a further mechanism for ensuring consistency of the visual appearance of treatments provided to respondents so as to reduce the likelihood of bias arising from differences between the quality and/or richness of the content when two or more two treatments are on offer.

Figure 13:
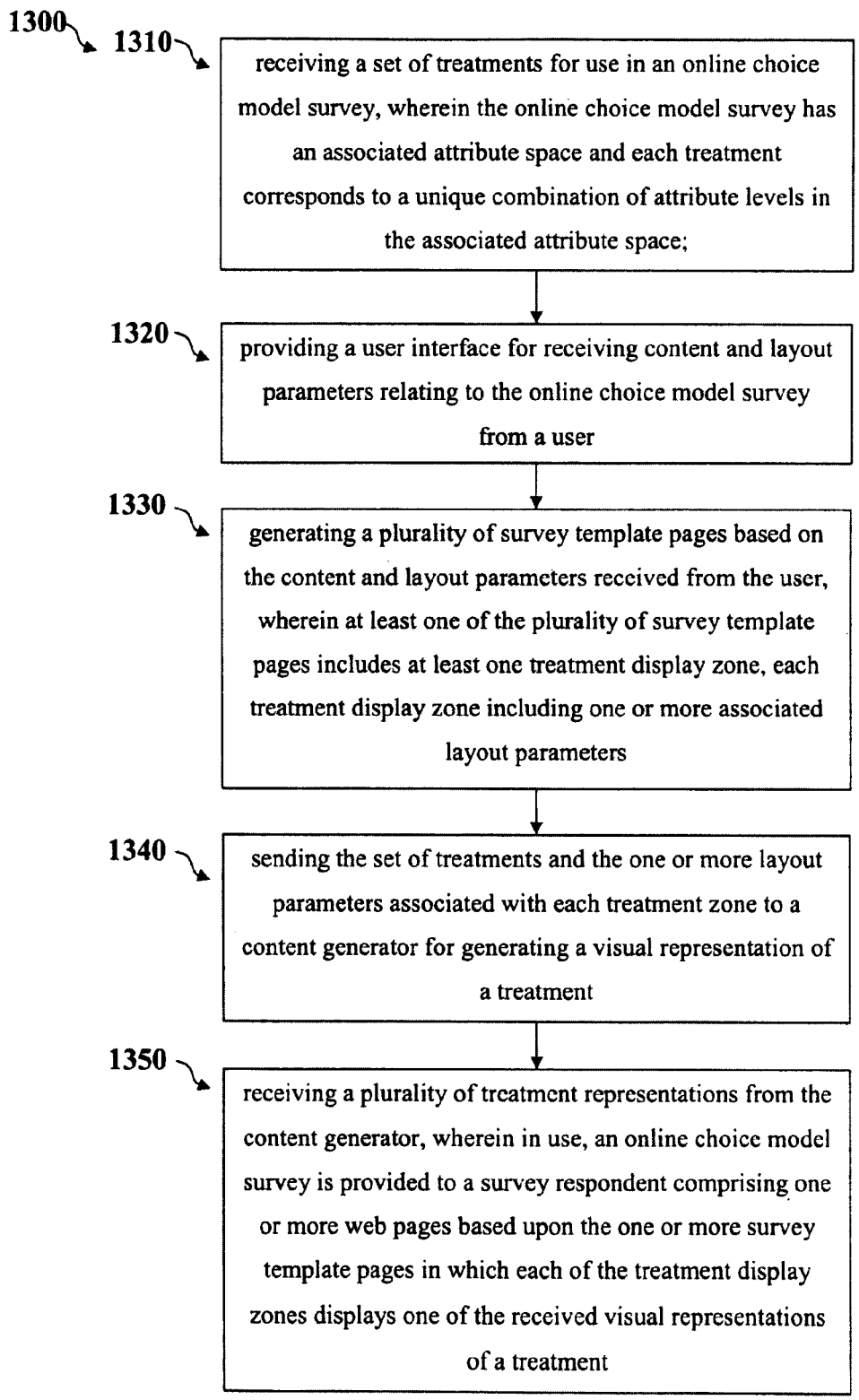
FIG. 13 is a flowchart of a method for creating an online choice model survey according to an embodiment of the present invention.

A flowchart 1300 of a method for creating an online choice model survey is illustrated in FIG. 13. The method includes the steps of receiving a plurality or set of treatments for use in an online choice model survey 1310. At step 1320 a user interface is also provided for receiving content and layout parameters relating to the online choice model survey from a user. The next step 1330 includes generating a plurality of survey template pages based on the content and layout parameters received from the user. At least one of the survey template pages includes at least one treatment display zone with each treatment display zone including one or more associated layout parameters. If only one treatment display zone is displayed then the choice to the user is to choose, or not to choose that single treatment. In many cases two treatment display zones will be used to provider the user with a choice between two treatments. In other embodiments, more than two treatments may be displayed and the user must select one (from the many offered). The set of treatments and the one or more layout parameters associated with each treatment zone are then sent to a content generator for generating a visual representation of a treatment 1340. The final step 350 includes receiving a plurality (ie a set) of treatment representations from the content generator. The representations will then be used in the online choice model survey provided to survey respondents. The online survey includes one or more web pages based upon the one or more survey template pages in which each of the treatment display zones displays one of the received visual representations of a treatment. The content generator may include an uploading interface for uploading digital content representing an attribute level for one or more attribute levels. This may be images, videos, audio etc.

Figure 4:
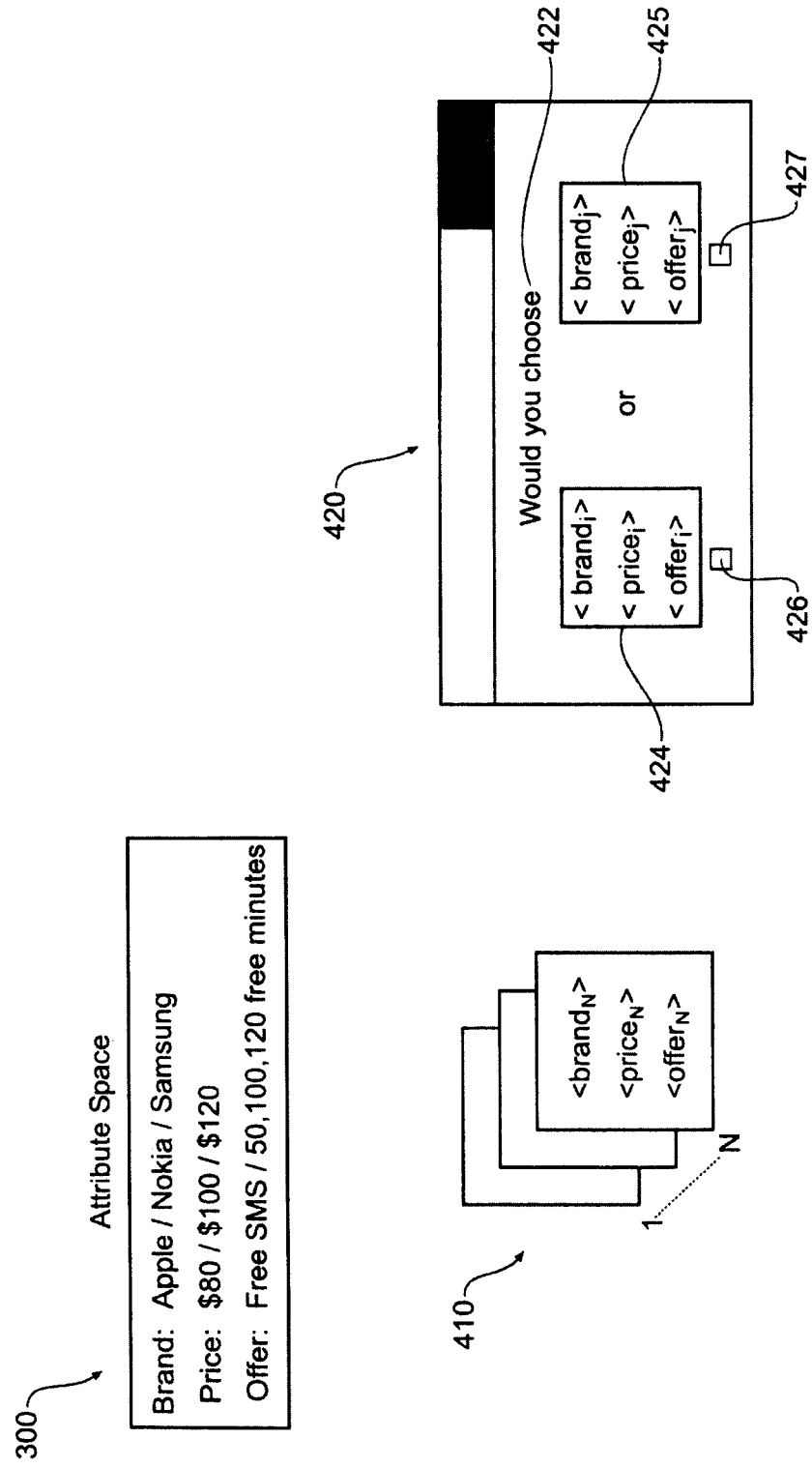
FIG. 4 is a schematic of a method for generating an online survey according to an embodiment of the present invention.
Figure 5:
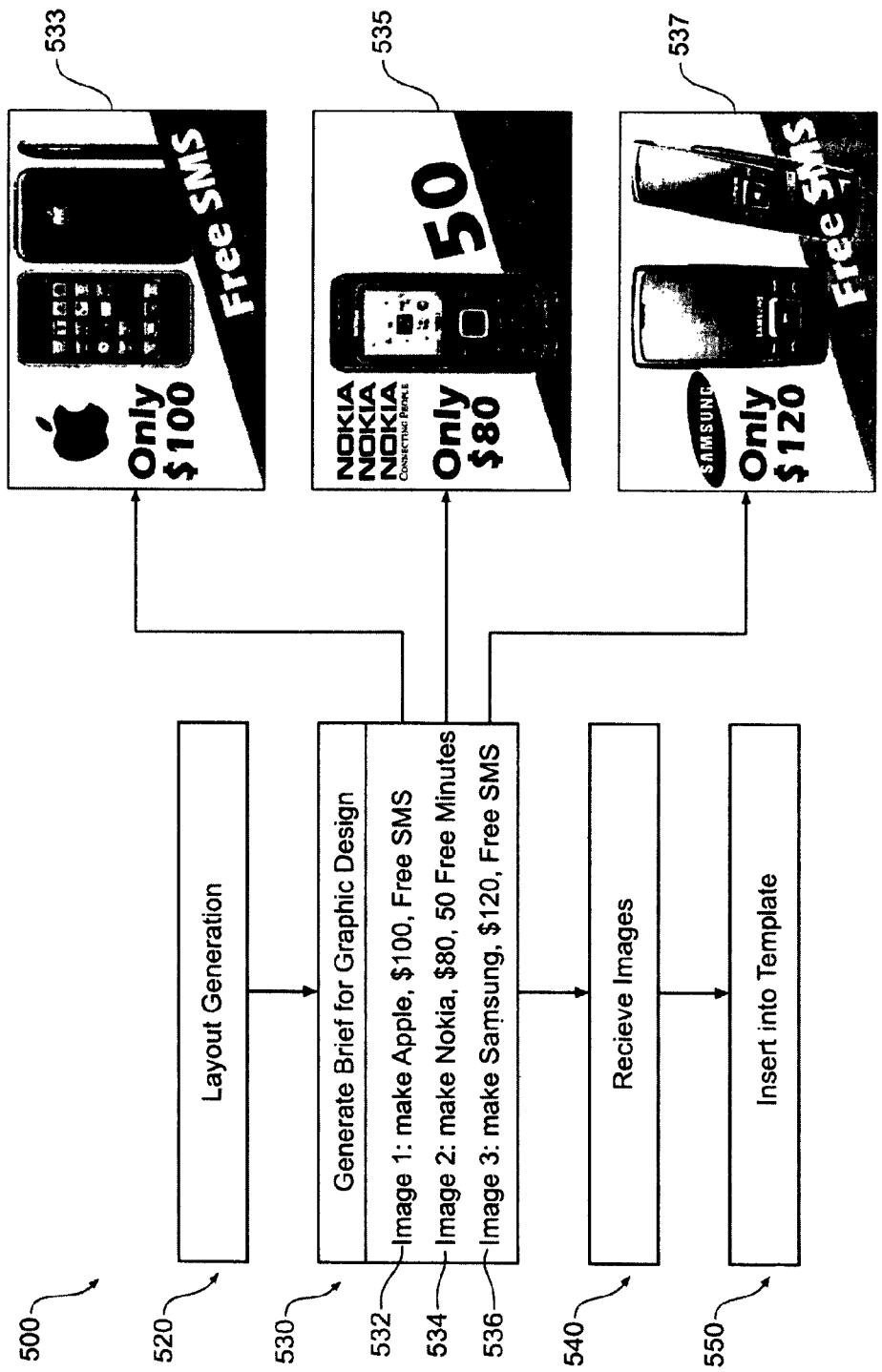
FIG. 5 is a flowchart for obtaining a visual representation of a treatment for use in a survey page according to an embodiment of the present invention.

This is further illustrated with reference to FIGS. 4 and 5. FIG. 4 is a schematic of a method for generating an online survey according to an embodiment of the present invention. FIG. 5 is a flowchart for obtaining a visual representation of a treatment for use in a survey page according to an embodiment of the present invention. FIG. 4 illustrates attribute space 300 shown in FIG. 3. A set of N treatments 410 is obtained from the experimental design module. Each treatment corresponds to a unique combination of attribute levels in the associated attribute space. A representation of a template survey page 420 is shown and specifies the format, content and layout of the page to be displayed to a survey respondent in an online survey. This may include the wording of the choice text 422, two treatment placeholder or display zones 424 and 425 to display a scenario (e.g. treatment, and treatment) and selection input means 426 and 427 to allow a user to select an offered treatment (or neither if allowed by the problem definition). For clarity, the subscripts i and j in relation to the attribute levels designate the treatment index and not the attribute level (ie brand$_i$ and brand$_j$ may correspond to the same attribute level of the brand attribute). The individual treatment placeholders or display zones 424 and 425 are zones in which visual or textual representations of a treatment (and in particular each of the attribute levels associated with that treatment) will be placed when the survey page is delivered to a respondent. Each treatment display zone may include one or more associated layout parameters. The user can specify various layout parameters of a treatment placeholder such as the size, shape and other visual aspects. A representation of the treatment, such as an image, text or visual representations may then be obtained from a human or computer content generator. In some cases rendering or generation of the treatment may be done on in real time as a survey page is provided to a respondent.

The layout of this page may be automatically generated by the system on the basis of information provided by investigator (via the user interface) during problem definition, and on the basis of treatments obtained from the experimental design module 120. The investigator could then be given the opportunity to review, amend and/or approve of auto generated survey template pages. Alternatively the investigator (or third party) may generate one or more survey template pages, along with associated introduction and conclusion pages. Different survey templates could be produced for the same problem and for use with different segments or groups of respondents. The templates may allow the user to control content (e.g. images and wording of choice text) along with placement and control of attributes in a display template. Various web technologies, languages and protocols could be utilised including HTML, XML, XML, Flash, JavaScript, ASP .NET, Java, etc, and various content and images may be uploaded.

An overview of a process for obtaining a visual representation of a treatment is shown in FIG. 5. Layout generation is performed to obtain a layout 420 which includes two treatment placeholders in which images of a specific treatment will be displayed. A brief 530 for a graphic designer is produced based upon the set of treatments and the associated treatment placeholder layout parameters. For example, the brief may request generation of a first image 532 showing a representation of an Apple brand phone, at a price of $100 with an offer of Free SMS; a second image 534 showing a representation of an Nokia brand phone, at a price of $80 with an offer of 50 Free Minutes; and a third image 536 showing a representation of an Samsung brand phone, at a price of $120 with an offer of Free SMS. The brief may also contain details such as required dimensions, colours, size, etc. Multiple briefs may be may be produced to different generators, and multiple images may be produced for the same treatment. The content generator, such as graphic designer or software application produces respective images 533, 535 and 537 corresponding to the three requests. These are then sent back to the system where they received 540 and are then inserted 550 into the templates when the respective survey page requesting a representation of a treatment is served to a respondent. In this way a plurality of survey template pages based on the content and layout parameters received from the user can be generated and multiple surveys can be produced dynamically for different survey respondents.

Once a survey is assembled it may be reviewed, edited and modified and then published, at which point the Data Collection and Sampling Module 140 is used to conduct the survey including allocation of treatments to survey respondents, and collection of responses. This module controls access to the online survey and provides survey respondents with a link to the online survey, such as via email, and any authentication details (eg login and password). A database of respondents may be used, or otherwise recruited, such as through advertisement on a web page or other means. In some embodiments the survey module will store data on the respondents to track participation and to also ask standard demographic questions such as age, sex, income, etc, or other questions, to allow segmentation of respondents on completion of the survey. The module collects respondent's choices and monitors progress of the online survey and when sufficient subjects have completed the survey the survey is closed, and the collected data is assembled and provided to the Model Generation Module 150.

One aspect of the Data Collection and Sampling Module 140 is the treatment allocation module. For a given scenario there may be N treatments to allocate to respondents. Further in an online system multiple treatments may be offered to the same respondent. However it is preferable that the same treatment is not issued to the same respondent more than once. There is however no explicit requirement for every respondent to get the same number of treatments, and a range of different online surveys with different numbers of treatments could be produced for the same underlying problem. The treatment allocation process may be likened to a dealer with a shuffled deck of N unique cards dealing to many players (respondents) who may require cards at any time. When the deck is dealt, the dealer takes a new shuffled deck but has to ensure that none of the same cards are dealt to respondents already holding them.

In one embodiment treatments are allocated to survey respondents free of uncontrolled bias whilst being done in way that minimises collection of superfluous data (i.e. it is efficient). Further this approach should work efficiently with small sample sizes, large numbers of treatments, and remain balanced even if the respondents are segmented or stratified (e.g. according to sex, income etc) and the segments separately analysed.

One approach is to use a purely random sampling methodology for selecting which treatment to allocate to a respondent. This approach is generally acceptable for large samples where only one treatment is delivered to each respondent. However unintended bias can creep in when small sample sizes are used, large numbers of treatments are required or repeated treatments are delivered to the same individual.

Figure 14:
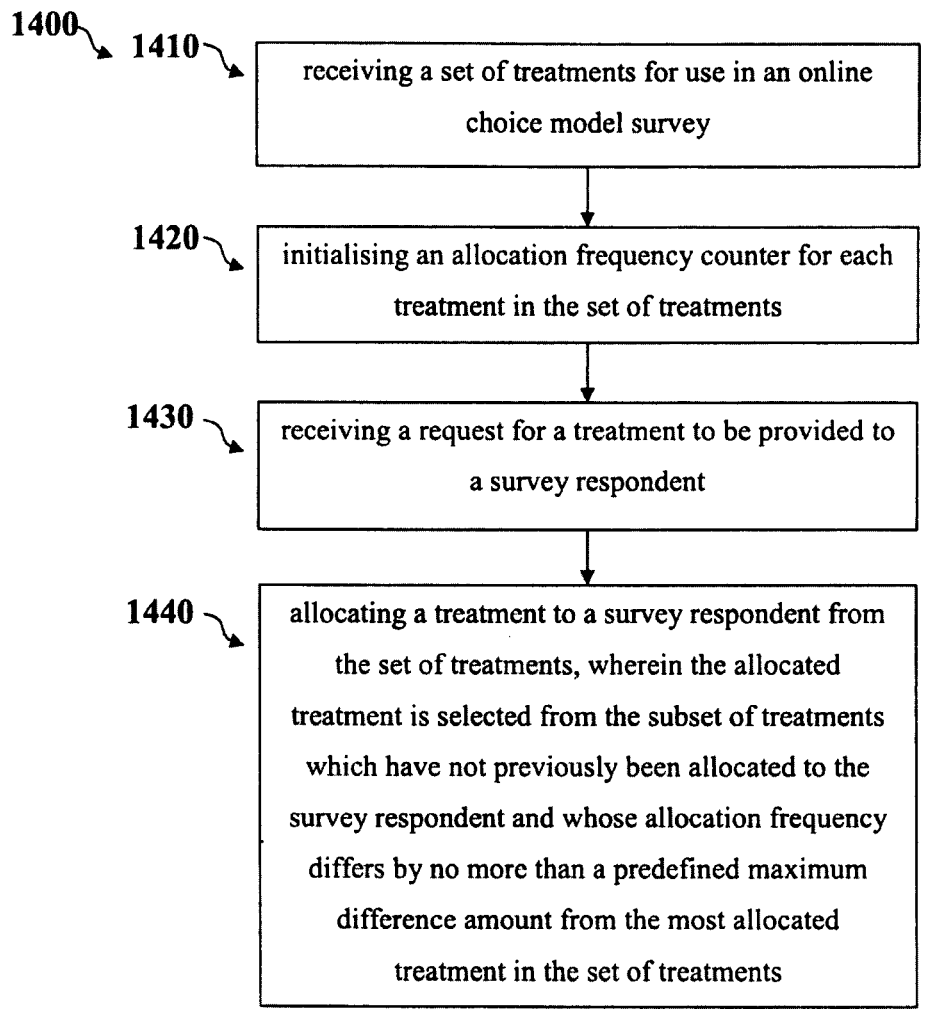
FIG. 14 is a flowchart of a method for allocating a treatment to a survey respondent according to an embodiment of the present invention.

In order to address such issues a method for allocating a treatment to a survey respondent from a set of treatments in an online choice model survey has been developed, and a flowchart 1400 is shown in FIG. 14. In this embodiment, after receiving a set of treatments for use in an online survey 1410, an allocation frequency counter is created and initialised for each treatment in the set of treatments 1420. Upon receiving a request for a treatment to be provided to a survey respondent 1430 a treatment is randomly allocated from the subset of treatments which have not previously been allocated to the survey respondent and whose allocation frequency differs by no more than a predefined maximum difference amount (also referred to as max_diff) from the most allocated treatment in the set of treatments 1440. That is the difference between the most allocated treatment and the least allocated treatment is less than or equal to some threshold amount and is performed in order to minimise bias. In one embodiment the value of max_diff is 1 so that at any point in the experiment the frequency of treatments delivered differs by no more that one. However as this may not always be possible max_diff may be set to 2 to handle occasional overflow cases discussed below. To ensure efficient allocation each treatment has an equal probability of being shown to a respondent. Also in cases where respondents are offered multiple treatments, the system may also track which treatments are provided to which respondents to enable a respondent to check their response to a previous treatment.

Figure 6:
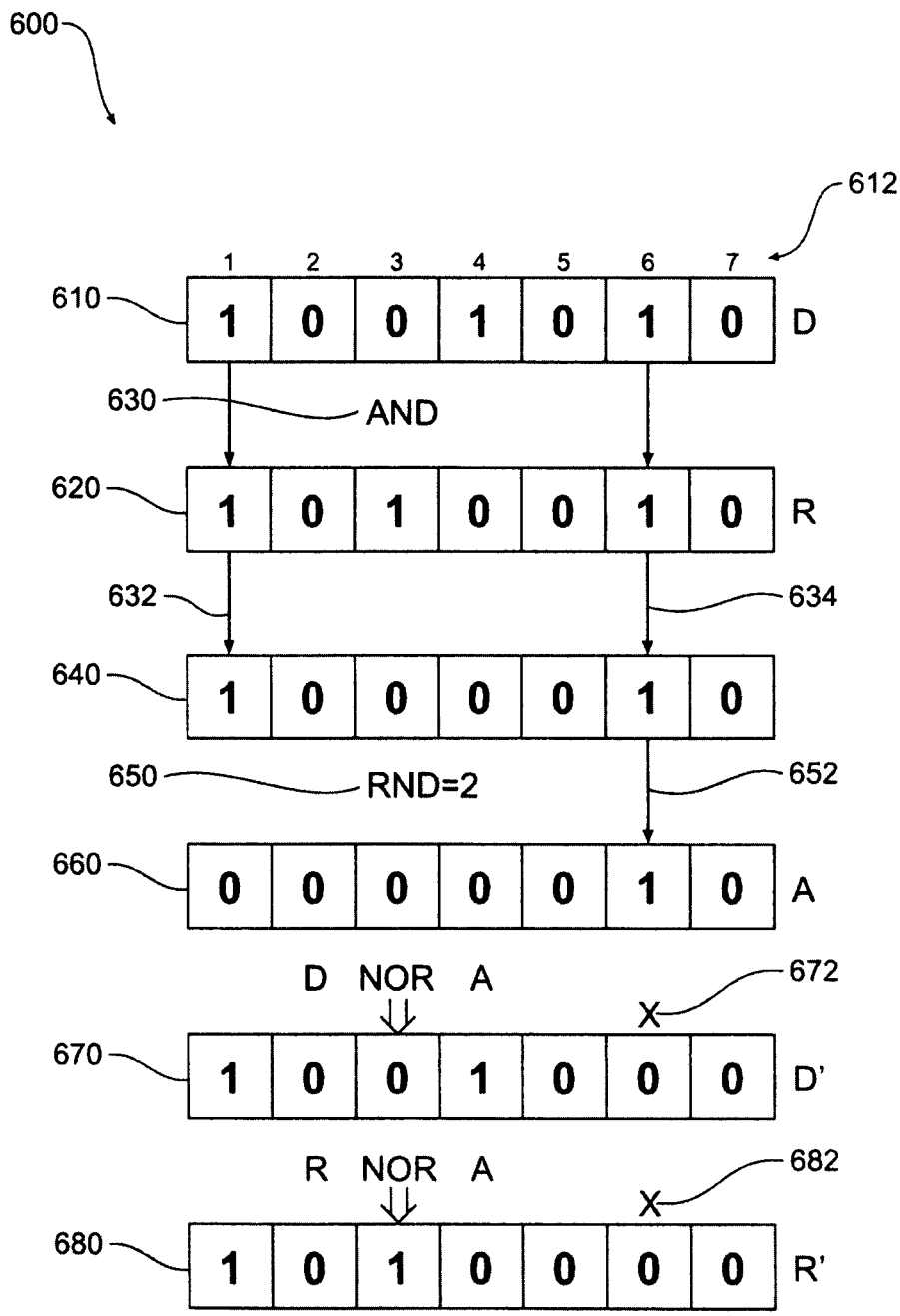
FIG. 6 is an illustration of a method for allocating treatments to survey respondents.

Turning to FIG. 6, a schematic of the method for allocating a treatment $T_k$, from a set of N treatments to a respondent is shown. In this method, a length N global binary Deck Vector D is defined for the segment of respondents. This vector is initialised as a string of N ones (1) indicating that all treatments are available. A respondent allocation vector R of length N is also defined for each respondent which indicates whether a given treatments has been delivered to the respondent. This is initialised as a string of N ones ("1"). A respondent history vector may also be defined that records the order of allocations made.

In the example shown in FIG. 6, there are N=7 treatments to allocate and thus the corresponding global binary deck vector D and respondent allocation vector R comprises 7 positions 612 (i.e. length 7). The current state 610 of global deck vector D, has "1"'s in positions 1, 4 and 6 indicating that these treatments are available for allocation. The current respondent for whom a treatment is to be allocated has a respondent vector with "1"'s in positions 1, 3 and 6 indicating that the treatments corresponding to these positions have not previously been allocated to this respondent. A binary AND 630 is performed between the current state of global deck vector 610 and respondent vector 612 to obtain an availability vector 640 which has "1"'s in positions 1 and 6 indicating the treatments corresponding to these positions are available to be allocated. The number of available positions (2) is calculated and a random position is selected from the available positions. This is obtained by selecting a random number RND 650 from a uniform distribution of length equal to the number of available positions. In this case the random number selected 650 has a value of 2 indicating the treatment corresponding to the second available position 652 in the availability vector 660, which in this case is position 6, is to be allocated to the respondent.

The global deck vector is updated by performing a binary NOR between the current state of the global deck vector D 610 and an allocation or availability vector A 660 which has a single 1 in the position of the allocated treatment (in this case position 6), to obtain updated global deck vector 670 which now has a zero in position 6 672 (marked as an X on FIG. 6). The respondent vector is updated by changing the state of allocated position 6 to a "0" 682 (marked as X on FIG. 6) to yield updated respondent vector R' 680 which can be obtained by performing the operation R NOR A. A respondent history vector 680 is also updated to indicate that the next treatment allocated to the respondent was the treatment corresponding to position 6 (i.e. the allocation order is 5, 4, 7, 2, 6).

This procedure is then repeated for the next respondent. If the global binary deck becomes empty after an update step (i.e. all treatments have been allocated to all respondents), then it is then reset to a string of ones ("1"'s) to allow the treatments to be allocated to different respondents. This approach ensures random allocation of treatments whilst ensuring that the maximum difference (max_diff) between the most allocated treatment and the least allocated treatment does not exceed 1. It will be understood that as the vector is binary in nature, "1"'s and "0"'s represent binary states and could be exchanged, or be given alternate terminology (on/off, high/low etc).

Figure 7:
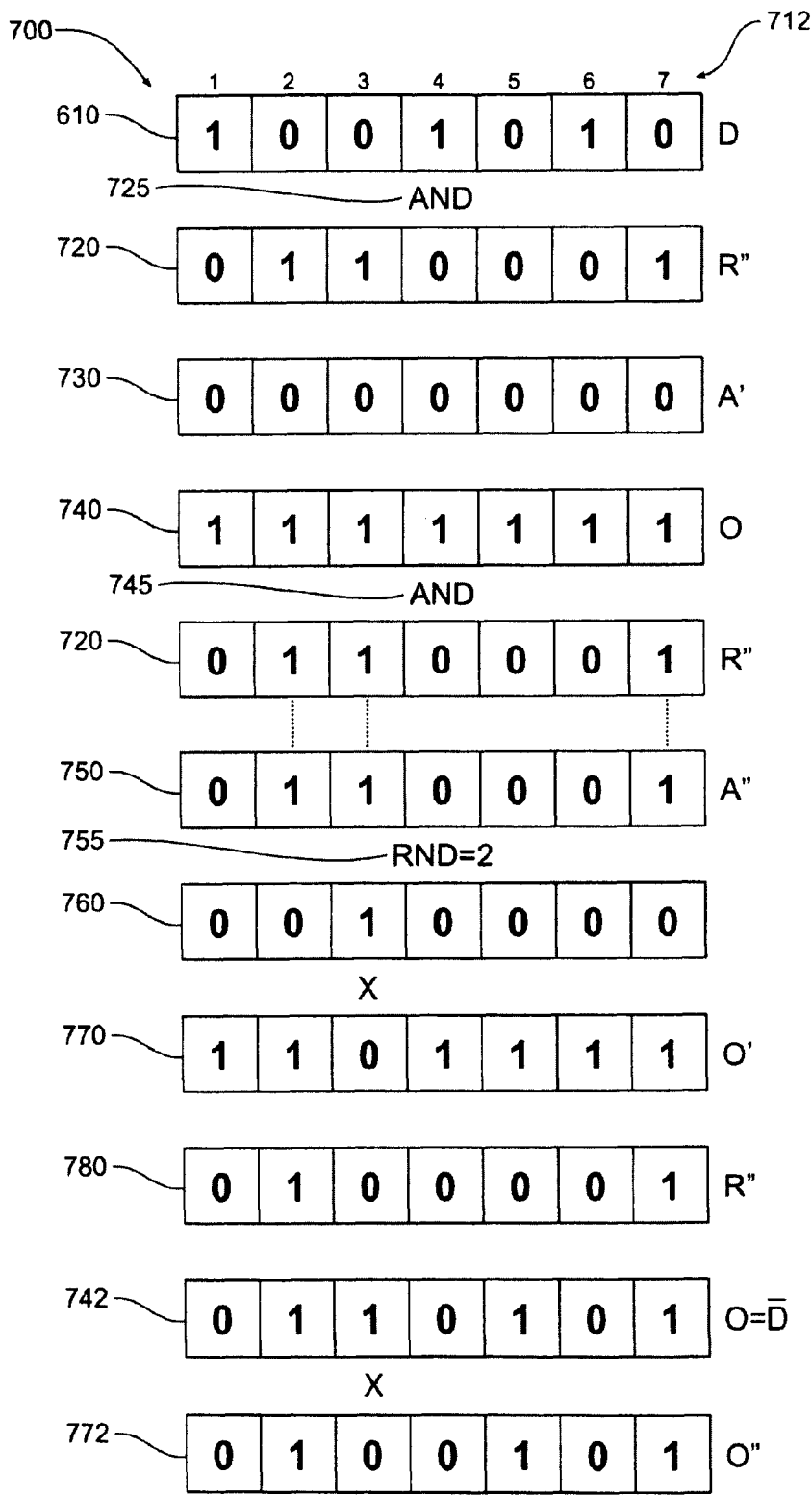
FIG. 7 is an illustration of a modification of the method shown in FIG. 6.

Occasionally the situation may occur that there are no available positions to allocate (i.e. the availability vector 640 is a zero vector). This is illustrated in FIG. 7 which represents a modified method for allocating a treatment to a respondent. In this embodiment the same global deck vector 610 is in use, but in this case the respondent vector R" 720 has "1"'s in position 2, 3 and 7. Performing an AND 725 results in the availability vector A' 730 being a zero vector. In this case it is no longer possible to allocate a treatment to this respondent and keep the maximum difference at 1 or less, and thus the limitation that max_diff$\leq$1 must be temporarily lifted.

One approach to this situation would be to randomly allocate a treatment for the respondent that has not previously been allocated to the respondent before. For example a random position in the respondent vector could be selected and then the respondent vector and respondent history vector updated as before (there is no need to update the global deck vector as it already records that this treatment has been allocated). However, whilst this may be suitable for this respondent, if the same scenario subsequently occurs to another respondent, and the same position is randomly selected, then this approach may lead to the maximum difference exceeding 2.

Thus to avoid this issue, an overflow vector may be defined to handle cases where the availability vector is zero. The overflow vector O is an N length vector and may be initialised to contain "1"'s. FIG. 7 shows an example of an overflow vector O 740. A binary AND 745 is performed between the respondent vector R" and O gives rise to a new availability vector A" 750 with a 1 in positions 2, 3 and 7. As above the number of available positions (2) is calculated and a random position is selected from the available positions. If the random number 2 is generated then the second available position, in this case position 3 is selected as the treatment to be allocated represented as allocation vector 760. Following allocation the updated overflow vector O' 770 and updated respondent vector R''' 780 is obtained by setting position 3 to zero (e.g. by NOR'ing the respective vectors with allocation vector 760). In an alternative embodiment the overflow vector O may be created as the complement of the global deck vector i.e. O=$\overline{D}$ 742, which leads to an alternative updated overflow vector O" 772.

The Model Generation Module 150 receives the collected data and builds a model according to the dependent variable question such as "Which phone would you buy". The output of the model generation step (if successful) is set of model parameter estimates and uncertainties (variation or errors) from which utility estimates can be obtained for each attribute level. In one embodiment the Model data is automatically created from the data collected and the experiment definition and the sampling or treatment plan such the model data has the following structure:

one row per respondent, per scenario, per alternative;
the respondent identifier and scenario number are concatenated into a unique strata variable;
each independent variable is transformed to effects coding;
each dependent variable is coded as one (1) when it occurs on the alternative row, otherwise zero (0); and
the model specification defines the meaning of all the variables experiment definition.

The model data and definition may be packaged into a script for processing by a statistical model engine/system such as SPSS, SAS, R, S, etc using syntax appropriate to the respective system. The analysed data and model may then be imported and parsed into the model generation module to allow implementation and exploration of the model by the model explorer. Additionally a test/validation approach may be used to allow empirical determination of the accuracy of the model generation process. In this approach the observed data is split into two sets; a training set and a validation set. A predictive model is then generated using by the statistical model engine using the training set. A set of predictions is then made by the model using the validation set. The predictions for the validation set are compared against the observed results for the validation set, and appropriate confidence statistics are then produced to assess the accuracy of the model.

Once an appropriate model has been generated by the Model Generation Module 150, the Model Explorer Module 190 utilises the model produced and provides a model explorer user interface 160 user for the investigator to explore the model results. In one embodiment this is based upon the input order of attributes and attribute levels in the model definition user interface. For example it may have the same layout and attributes. Attribute levels may be reordered (eg numerically or alphabetically) or they may be as entered so the model explorer user interface substantially mirrors the mode definition user interface. This aspect adds to the overall user friendliness of the system and hides the substantial complexity of the backend system. For some users these two user interfaces may be the complete extent of their interaction with the system. The model explorer user interface allows the end user to fully explore the results and the associated uncertainties, and thus provides them with a tool to obtain the necessary information to make an informed decision regarding their problem or query.

Referring back to FIG. 1, the model exploration user interface 160 includes an attribute level selection zone for each attribute which allows a user to select one of the levels associated with that attribute. The order of the attribute level selection zones may be based upon or presented in the input order of the attributes to the attribute user interface so as to provide a consistent user interface which matches the initial input order of the user, for example in FIG. 1 brand selection zone 240, offer selection zone 250 and price selection zone 260 are displayed in the input order. For many lay users, the problem definition user interface, and the model explorer user interface may be the extent of their interaction with the system, with the system automating all the intermediate steps. Thus providing a model explorer user interface which mirrors the way the lay user input them to the system provides familiarity and ease of use suited to that lay user.

Each attribute selection zone includes a label indicating the attribute, and a user interface element for selecting one of the possible attribute levels associated with the attribute. For example a drop down selectable list may be utilised, or a set of radio buttons (one per level), text box, etc. In the example shown in FIG. 1 a drop down list from which a possible level may be selected is utilised.

The selected attribute levels are then entered into the generated model to obtain an estimate of the probability of uptake of the current product configuration defined by the current selected treatment (combination of attribute levels), along with the accuracy of the model predictions. The model exploration user interface thus further includes a prediction output zone 270 for displaying an estimate of the predicted uptake 272 and variability 274 from the statistical model for the current attribute level selections. In this case brand selection zone 240, offer selection zone 250 and price selection zone 260 are displayed with respective levels of "Apple" 242, "Free SMS" 252 and $80 262 generating a predicted uptake rate of 75% 272 with an estimated error of 1% 274. The model explorer thus allows the investigator to explore any or all of the possible mobile phone configurations in the attribute space to see the likelihood of uptake of each.

Figure 8:
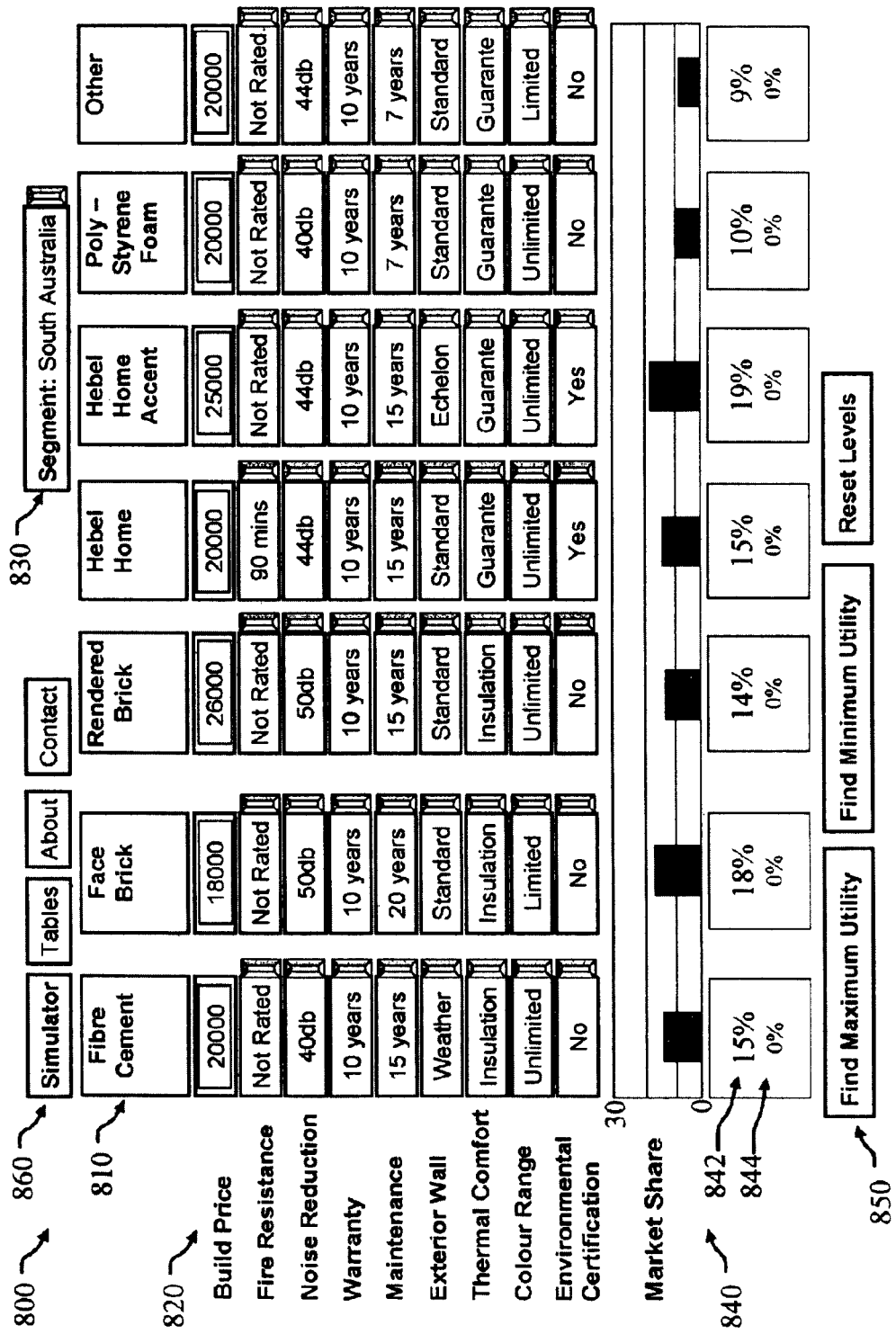
FIG. 8 is an illustration of an embodiment of a user interface for a model explorer module.

The model explorer user interface may also provide additional functionality to explore the model, such as plotting utility as a function of attribute levels according to different market segments, or generation of summary tables. An embodiment of a model explorer user interface 800 is shown in FIG. 8. In this embodiment the survey model relates to building preferences. Seven different types of building products materials were considered in this survey, comprising Fibre Cement, Face Brick, Rendered Brick, Hebel Home, Hebel Home Accent, Polystyrene Foam, and other. Each building type included 9 attributes comprising Build Price, Fire Resistance, Noise Reduction, Warranty, Maintenance, Exterior Wall, Thermal Comfort, Colour Range, and Environmental Certification. The attribute levels for each attribute varied based upon the type of building material (ie an Alternative Specific model). The building material types are arranged into columns 810, and the attributes are arranged in rows 820, so as to form a user input matrix for receiving user input on a particular combination of attributes (treatment) the user is interested in investigating (exploring). In this embodiment the user interface elements include text boxes for receiving a numerical build price, and drop down boxes to allow selection of a particular attribute level from the set (or list) of all possible attribute levels (values) for that attribute. A further user input element 830, in the form of a drop down box, allows selection of the market segment of interest. In this embodiment this may be the aggregate or total sample, or model results segmented by State, in this case New South Wales, Victoria, Queensland, and South Australia (the latter having been selected).

An output zone 840 allows the user to view the results estimated by the model for the selected set of attribute levels (treatments). In this case the results of the model are the predictions 842 of the percentage of market share that a particular product offered with the selected set of attributes would achieve. The predicted market share for each building type are displayed both graphically, the in the form of a bar chart, and numerically, under each respective building type. In this embodiment these values are updated each time an attribute level is changed. After each update, a change indicator 844 is displayed below the market share percentage which indicates the difference or change in market share from the last operation.

Additionally a collection of optimisation buttons 850 are provided to allow the user to view the attribute levels corresponding to the maximum or minimum utility in relation to a product or attribute. To utilise these optimisation buttons, a user first selects a building product (i.e. a column in the user input matrix), or an attribute (i.e. a row in the user input matrix) and then the maximum or minimum utility button. Upon selecting this button the model explorer determines attribute levels that either maximise or minimise (respectively) market share and this value is displayed along with the corresponding attribute levels in the user input matrix (and the difference from the previous values). In this way a user can quickly focus in on particular products or attributes, and easily determine the range of values, thereby gaining an understanding of either how to maximise market share for a product or attribute, or even the significance of different attributes in contributing to market share. For example the user can identify those attributes with large ranges and concentrate on those, whilst ignoring those with small ranges. A reset button is also provided to reset the attribute levels to a default or initial configuration. The user interface thus provides a rich environment to allow the user to explore and visualise the full attribute space, as well as providing tools to rapidly identify specific treatments which maximise the utility.

Additionally in this embodiment the user interface includes a collection of tabs 860, for providing additional information on the model. For example the tab shown in FIG. 8 corresponds to the simulator tab, allowing the user to select attribute values and inputs and observe the predicted utility (market share). Additional a tab can be provided for displaying tables. Tables may be provided for displaying the results for each market segment for a given set of attribute levels. In this way a user may gain an understanding of the different market segments. The tables may be static tables, such as those corresponding to maximum utility of a particular product or attribute, or they may be dynamic tables which are updated each time a new set of attributes are chosen using the simulator page. Other tabs such as notes on the study, help pages on how to use the model explorer, contact details etc, may be provided as required.

The user interface may be provided as an html document including JavaScript code to provide user interface elements such as tabs, drop down boxes, buttons, tabs and selectable columns and rows to allow a user to explore the model. Alternatively the user interface could be provided as part of a stand alone module or as a client application in a client-server based system. A cloud based approach could be utilised. Various programming languages or web technologies could be utilised to implement the user interface such as HTML, JavaScript, ASP .NET, Java, C#, ASP, Perl, Python, XML, etc.

A further example will not be described in relation to the identification of the importance of abstract visual elements of a magazine layout. Magazines are typically displayed in racks of magazines found in supermarkets, newsagents, book stores or convenience shops. Given the competitive nature of this market place, it is important the cover of the magazine attracts the interest (i.e. is eye catching) to the target audience. In this study the magazine publisher of a gardening magazine is interested in identifying which elements of the cover (masthead, font, box layout and background image) and which elements (and execution of these elements) have the greatest impact on choice. The attributes and levels investigated are printed in Table 3.

TABLE 3

Attributes and levels for Magazine Cover Study

| Masthead | Font | Background | Box Layout |
|---|---|---|---|
| Bleed | Lower | pink flower | No box |
| White | Upper | white flower | Side box |
| | Script | yellow flower | 3 boxes |
| | | lavender flower | 1 box |
| | | orange flower | |
| | | garden | |
| | | person | |
| | | berries | |

Figure 9:
FIG. 9 show a choice template for use in an online survey according to an embodiment of the present invention.
Figure 10:
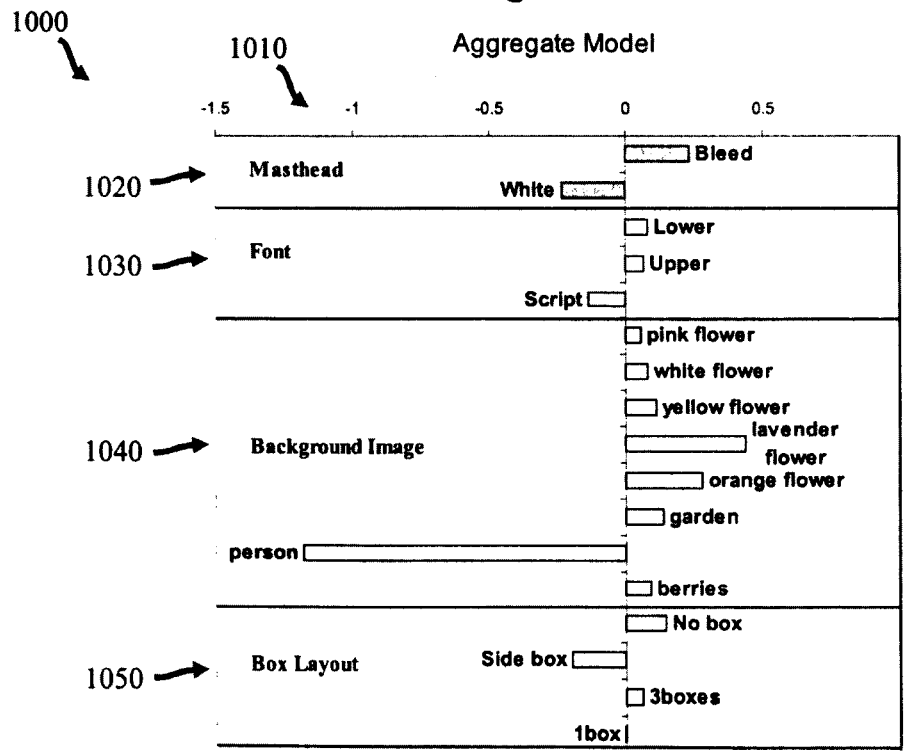
FIG. 10 shows the estimated utilities and errors for the aggregate model obtained from performing an online survey according to an embodiment of the present invention.

The attribute space for this study was 2×3×9×4, and a suitable experiment design was developed from a base design. Images of magazine covers were produced for each treatment to be used in the survey and an online survey instrument developed to conduct the survey. Respondents were presented with a set of choice template pages, each displaying two possible layouts (treatments) and asking them to select which layout they preferred. An example choice template 900 is presented in FIG. 9. A first magazine cover 910 is presented on the left and includes a masthead element 912, a font element 914, a background image 916 and a box layout element 918. A first radio button 932 is provided to allow the respondent to select this image as the preferred image. Similarly a second magazine cover 920 is presented on the right and includes a masthead element 922, a font element 924, a background image 926 and a box layout element 928. A second radio button 934 is provided to allow the respondent to select the second image as the preferred image. Indicators are also provided to indicate how far through the survey they are, as well as navigation buttons to enable them to view previous selections or to advance to the next set of treatments. To enable stratification of the respondents, the respondents were also asked a series of questions relating to gender, where they buy the magazine, how often they read it, and how long they have read it for, etc. Responses were collected from 721 respondents which were then used to build a statistical model. The estimated utilities (ie the model coefficients) and errors for the aggregate model are presented in Table 4 and graphically in FIG. 10. Models for different market segments can also be produced (e.g. for males, females, long term readers, readers who purchase the magazine at supermarkets, etc). The null hypothesis for each model coefficient is zero utility and thus positive utilities indicate positive preference and negative utilities indicate negative preference. A probability value or significance of a deviation from zero utility can be obtained using parametric or non parametric (eg sampling) approaches.

TABLE 4

Estimated utilities and error from aggregate model for magazine layout preferences

| | Model | |
|---|---|---|
| Attribute | Utility | Error |
| Masthead | | |
| Bleed | 0.233 | ±0.011 |
| White | −0.233 | ±0.005 |
| Font | | |
| Lower | 0.077 | ±0.018 |
| Upper | 0.063 | ±0.025 |
| Script | −0.141 | ±0.014 |
| Box layout | | |
| No box | 0.144 | ±0.024 |
| Side box | −0.198 | ±0.059 |
| 3 boxes | 0.061 | ±0.023 |
| 1 box | −0.007 | ±0.026 |
| Background | | |
| Pink flower | 0.054 | ±0.044 |
| white flower | 0.08 | ±0.068 |
| yellow flower | 0.11 | ±0.043 |
| lavender flower | 0.433 | ±0.070 |
| orange flower | 0.276 | ±0.045 |
| garden | 0.137 | ±0.065 |
| person | −1.18 | ±0.048 |
| berries | 0.089 | ±0.048 |

TABLE 5

Attributes associated with the Most and Least Preferred Magazine Covers

| Most Preferred | | | Least Preferred | | |
|---|---|---|---|---|---|
| Attribute | Level | Attribute weighting in decision making | Attribute | Level | Attribute weighting in decision making |
| Masthead | Bleed | 26% | Masthead | white | 13% |
| Font | Museo lower | 9% | Font | script | 8% |
| Background image | lavender | 49% | Background image | person | 68% |
| Box layout | No box | 16% | Box layout | Side box | 11% |

These results indicate that readers prefer a bleed masthead, a non script font (whether lower or upper case), and flowers or other garden matter on the background of the cover. Readers very clearly did not want to see people on the cover, although the results don't indicate whether its people or the specific models used in the test layouts. Finally side boxes were very unpopular. FIG. 11 illustrates the most preferred (left) and least preferred (right) covers and Table 5 presents the associated attribute levels and their respective weighting in the decision making.

The ability to view both most preferred cover, least preferred cover, estimated weight in decision making for both aggregate (total) datasets as well as by segment or strata, provides a variety of useful information to a magazine publisher. Such results can be used by the magazine publisher to make informed choices on future covers, such as through the design of covers to suit a particular segment, such as readers which only read the magazine occasionally (i.e. in order to boost sales in this segment in an attempt to convert them to regular readers), or based on sex for issues near Mother's or Father's day.

The system can also be used to perform adaptive experimental designs, in which the design is modified as significant effects are identified so that information on other effects or cross (interaction effects) can be identified. In this approach the survey is divided into one or more phases. Each phase involves generation of an attribute space, generation of a design, performing a survey, and estimating significant effects. The first phase generates a design based on the user defined attribute space, and any subsequent phases generates a design based on the adjusted attribute space, subject to modification of treatments to include random allocation of deleted attributes.

In lieu of any information about the group of individuals to be modelled, experimental designs are generally optimised for the null hypothesis that all effects have zero values, and this design is used as the starting point of the survey. Typically surveys include a large number of attributes and levels, and thus the design will attempt to estimate the main effects. In reality—at some point in data collection and modelling—non-zero effects emerge and can be identified and presented to the user.

Whilst further data collection is likely to refine the accuracy (uncertainty) of the significant main effects, in some cases it may be desirable to accept that accuracy and modify the design to take this into account and enable identification of other more subtle effects, or for cross or interaction effects which were not estimated (or inefficiently estimated) in the main effects model.

To illustrate consider a small choice experiment on mobile phones in which we are interested in Price (say 4 levels), Brands (Apple, Nokia, Generic Brand A, Generic Brand B) and Form Factor (2 levels). A first design is generated for this attribute space (4×4×2) and data is collected. After a first period of data collection (eg $N_1$ samples) a model is fitted or built and no difference between Generic A and Generic B is identified, and that the effect of Form Factor is dwarfed by Price and the remaining Brands.

A second phase of the experiment is then conducted in which the design is adjusted by the design generator to concentrate on what is known to be relevant (Price, and the Apple and Nokia Brands) and to thus produce a smaller design. The advantage of this approach is that it allows more efficient use of the remaining sample or can reuse the reclaimed information space to investigate more subtle effects.

A more realistic example relates to Mobile phones in which a choice experiment is performed over the full set of features and services for mobile phones (everything from price, brand, store location, support etc) producing an experiment with 50 variables (attributes). A first experimental design is generated by the design generator module with 256 unique experiment treatments and is designed to capture 'main effects' (ie no cross effects). After a first data collection period, the results are modelled and it is determined that 5 of the attributes contribute to 90% of explaining variation in choice, with the other 45 contributing very little.

In the next phase, the design is adjusted to concentrate on the 5 significant attributes. As the number of variables has been substantially reduced the adjusted design can also attempt to estimate the cross or interaction effects between the 5 variables, which then increases the number of variables back up to approximately 50. The design generator module is again utilised to generate the adjusted design (the second design), and a second period of data collection is performed. After the second data collection period, the results are again modelled and it is observed that 2 of the cross effects are significant, with the rest being irrelevant (insignificant). In the third phase, a model is rebuilt to study 3 way effects for the relevant attributes. A further data collection period is performed and the results are again modelled. At the end of the three stages, and overall model is produced which allows sensible predictions about price and brand and relevant interaction effects to be obtained and utilised. As a full search for these effects would have required a prohibitively large design, the use of an adaptive or phased approach allows deeper investigations to be performed as relevant information comes to light.

A range of adaptive or phased approaches can be implemented. For example a first approach attempts to remove irrelevant attributes at the end of the phase. In this approach the first phase comprises building a main-effects design for the problem space. After $N_1$ replications of the design have been collected, a model is built (fitted). A predefined (eg 0.05 or 5%) or user defined significance cut-off value is used to remove each attribute with a zero effect from the design (ie p value>cut-off). In the next phase an adjusted design is then generated by the design generator based upon the reduced attribute space and then further data collection ($N_i$) is performed followed by model building and identification of insignificant effects. A second related approach is to remove identified attributes at the end of each phase. In this approach, after data collection and model building, those attributes with significant effects are deleted (p value≤cut off). A further related approach is to increase resolution of important (significant) attributes. As before the first phase builds a main effects design, data is collected ($N_1$ samples) and a model is built. The top Y statistically non zero effects are estimated, and the remaining attributes are deleted. In the next phase a cross effects design for the top Y statistically significant main effects and all their cross combinations are generated by the design generator for this new attribute space.

An adaptive system could be preconfigured, or user configured, to use a combination of the above three approaches. Suitable criteria for controlling the adaptive process is the amount of samples to collect in each phase ($N_i$) along with the significance cut off level or value, and the number of significant attributes Y to expand. Further the different approaches could be combined, with different phases using a different approach, or a search process could be implemented at the end of each phase to explore the effects of the three different approaches.

Additionally removal of an attribute from a design represents removal from the controlled experiment or the model. Such deleted attributes will still be presented (visible) in treatments, however their allocation to treatments will be random. This is to avoid bias and allow continued collection of data. In a further aspect a previously excluded attribute may be re-introduced into the model (attribute space) as more data is collected and the attribute, or a crosseffect of an attribute is found to be relevant.

Figure 15:
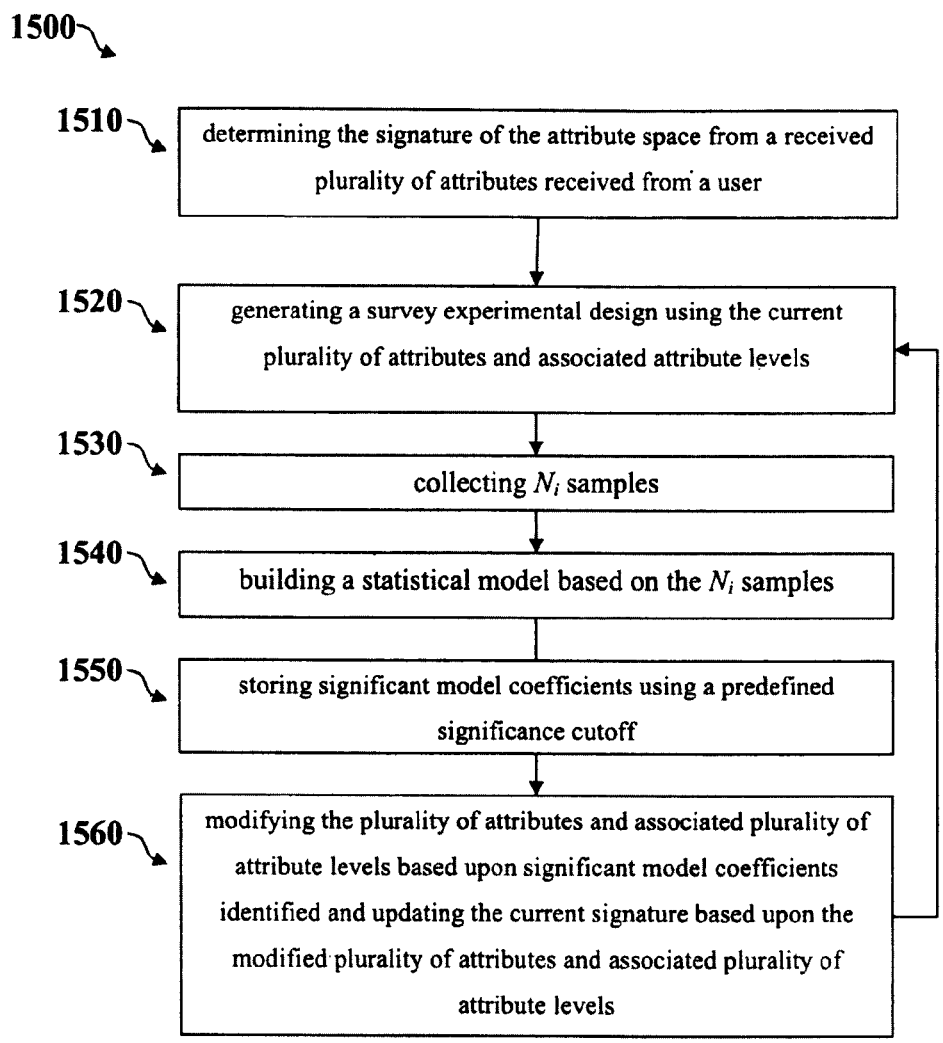
FIG. 15 is a flowchart of a method for performing an adaptive choice experiment according to an embodiment of the present invention.

The above described adaptive survey method is illustrated in flowchart 1500 in FIG. 15. The method begins at step 1510 with determining the signature of the attribute space from a plurality of attributes received from a user. At step 1520 the design generator module is used to generate a survey experimental design using the current plurality of attributes and associated attribute levels. At step 1530 the online survey is conducted and $N_t$ samples are collected. At step 1540 a statistical model based on the $N_t$ samples is built. At step 1550 the significant model coefficients are stored using a predefined significance cutoff. Then at step 1560 the plurality of attributes and associated plurality of attribute levels are modified based upon previously identified significant model coefficients (as discussed this may be deletion of either significant or non significant attributes). Then the current signature is updated based upon the modified plurality of attributes and associated plurality of attribute levels. The method then returns to step 1520 to generate a new design based on the adjusted signature (attribute space). The adjusted attribute space may be smaller (deletion only) or larger (deletion of some plus introduction of cross/interaction effects). If an entire attribute (and all levels) is deleted then it is still presented to user, but they are randomly allocated/appended to the treatments obtained from the adjusted design. Steps 1520 to 1550 may be repeated multiple times. After this a final model is built and the results displayed to the user and may be explored by the model explorer.

The system, above method, or various components could be implemented as a software system. A server could provide a web based user interface to allow investigators to enter data such a problem definition, create, modify and review the online survey, upload content, perform model exploration and download results. A user database could be provided to store information used to authenticate users and respondents, store contact and billing information etc. The server could also be used to generate and to serve, email or otherwise provide survey pages to respondents and to collect their responses. The system could be implemented on a single server or as a distributed system. A web based and/or client-server model could be used.

Figure 16:
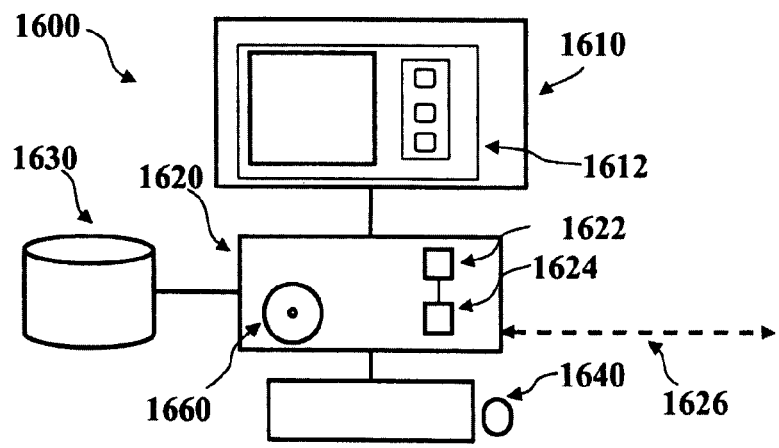
FIG. 16 is a representation of a computing system for implementing a method according to an embodiment of the present invention.

FIG. 16 is representation of a computer system 1600 implementing a method according to an embodiment of the present invention. The computer system includes a display device 1610, a general purpose computing device 1620 including a processor 1622 operatively coupled to a memory 1624, a storage device 1630 and user input devices 1640. An internet or network connection 1626 may also be provided. A computer readable medium 1660 such as a DVD may be inserted into the computing device to provide instructions for the processor 1622 to execute a software application 1612. Alternatively computer instructions may be stored on remote computing device (eg on one or more servers or in the Cloud), and downloaded and locally executed. The system may be distributed across multiple physical systems and devices.

Figure 17:
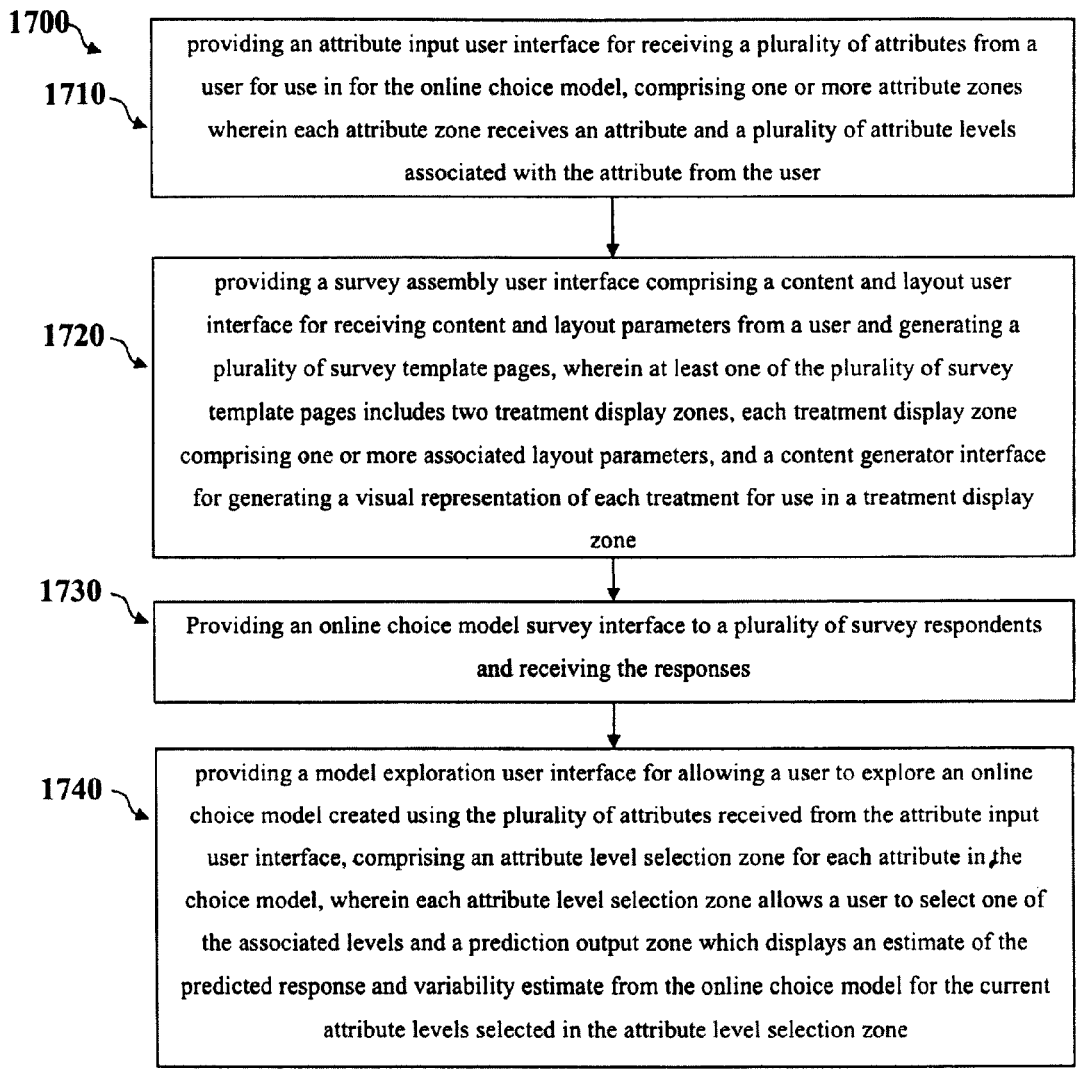
FIG. 17 is a flowchart of a method for providing a user interface for a choice experiment according to an embodiment of the present invention.

A flowchart 1700 of method for providing a user interface for an online choice model survey is illustrated in FIG. 17. An attribute input user interface is provided at step 1710 for receiving a plurality of attributes from a user for use in for the online choice model. This comprises one or more attribute zones wherein each attribute zone receives an attribute and a plurality of attribute levels associated with the attribute from the user. An experimental design generator module (running on a back end server) can receive this input and generate an experimental design and a set of treatments. At step 1720 a survey assembly user interface is provided comprising a content and layout user interface for receiving content and layout parameters from a user and generating a plurality of survey template pages, wherein at least one of the plurality of survey template pages includes at least one treatment display zone, each treatment display zone comprising one or more associated layout parameters. Other content pages can be generated for providing the user with information about the survey and for collecting other data from the user (eg demographics). A content generator interface is also provided for generating a visual representation of each treatment for use in a treatment display zone. This may generate the visual representations based on templates and/or treatments, or they maybe uploaded. At step 1730 the survey is then performed through the use of an online choice model survey interface which provides the survey (eg serves pages based on the assembled survey) to a plurality of survey respondents and receives the responses. The model generation model can collect the responses and build a statistical model. Then at step 1740, a model exploration user interface is provided for allowing a user to explore an online choice model created using the plurality of attributes received from the attribute input user interface. The model exploration user interface comprises an attribute level selection zone for each attribute in the choice model, wherein each attribute level selection zone allows a user to select one of the associated levels, and a prediction output zone which displays an estimate of the predicted response and variability estimate from the online choice model for the current attribute levels selected in the attribute level selection zone.

The user interface may be provided as a window with a series of user interface components and tabbed pages for creating, editing, and displaying various components of the survey and may use standard techniques, languages and user interface components such as typing in a text box, uploading a file, drag and drop, etc, as well as allowing the user to save the state and edit surveys under development or in progress. Various web technologies, languages and protocols could be utilised including HTML, XML. XML, Flash, JavaScript, ASP .NET, Java, etc, along with distributed or cloud computing based configurations. In one embodiment an initial screen could list current surveys, their status, and allow creation of new surveys, and editing of surveys under development, publishing or execution of surveys, model exploration of conducted surveys, and deletion of old surveys. For a given survey tabbed pages could be provided for the Survey, Layout, Experiment, Experiment Dictionary, and Graphics upload, and each tabbed page could have one or more panels, menus or tabbed pages. For example the Experiment tab could include an attributes tab, and experiment plan tab, and a preview tab. The attributes tab could allow entry of attributes and levels and present this in a table format (see FIG. 2). The experiment plan tab could present the design (eg $1^\wedge 24 \times 2^\wedge 34 \times 3^\wedge 5 \times 4^\wedge 6$ in 64 rows) and the preview page would allow the user to view each treatment or the template html. A dictionary tab could list each variable (including demographic and system variables) and attribute, a description, the associated levels of attributes, where the variable is used in the survey. The Survey page could have a panel along the left side which lists each page in the online survey, and a panel in the right which displays a selected page and allows editing, such as adding graphics, questions (open questions, closed questions, multiple choice, matrix), flow control and questions based on the answer to a previous question, survey introduction and end. A layout tab can be provided to create layouts or edit layouts based on predefined templates.

The system and components described herein addresses many of the problems associated with practical use of choice modelling by a lay person, allowing such lay persons to implement choice experiment to investigate their specific problems, and thus provides a number of advantages over the prior art. Firstly the system allows the end user to specify what they want to investigate—that is the number of attributes to consider, and the possible values of each attribute, that is the multidimensional attribute space. Rather than limiting the end user to a known experimental design forced onto them by a statistical consultant, the system attempts to modify existing known experimental designs to develop a design which matches the user specified attribute space. This provides the end users with considerable freedom and scope to investigate problems of specific interest. This user driven approach of the system contributes to the overall user friendliness of the system and enables the system to be agnostic to the actual model or design used, thereby advantageously providing a system which is flexible and adaptable. In additional to these broad benefits, the system also includes a number of advantageous features or components.

As discussed above the Experimental Design Generator Module 120 represents a significant advance over the prior art, allowing development of suitable designs to match the user specified attribute space. Further the module can perform simulations on a candidate design to estimate its characteristics, such as accuracy and/or precision (i.e. statistical power), and the dependence of such characteristics on sample size. In this way different candidate designs can be compared, and a final design chosen based on criteria requirements such as sample size and/or required precision (which typically relate to cost), or the top ranked designs can be provided to the user to allow the user to select the design to use.

The Online Survey Assembly Module 130 advantageously provides an efficient subsystem for construction of an online survey through the use of generic treatment placeholders. By incorporating generic treatment placeholders into the template pages for use in the survey, an online survey can be efficiently prepared either automatically, or by the end user without having to be overly concerned with the details of exact treatments to be offered, or the final visual appearance of any of the treatments to be tested. Instead the task of generating the content user to represent a treatment to be displayed to a survey respondent can be outsourced to a graphic designer and/or software application. This provides a further mechanism for ensuring consistency of the visual appearance of treatments provided to respondents so as to reduce the likelihood of bias arising from differences between the quality and/or richness of the content for the two treatments on offer.

The Data Collection and Sampling Module 140 advantageously provides an efficient mechanism for allocating treatments to survey respondents. The approach described herein advantageously allocates treatments to survey respondents free of uncontrolled bias whilst doing so in way that minimises collection of superfluous data. As cost is often related to the number of survey respondents this ensures the system is efficient in its used of survey respondents. Additionally this approach works efficiently with small sample sizes, large numbers of treatments, and remains balanced even if the respondents are segmented (e.g. according to sex, income etc) and the segments separately analysed.

The Model Explorer Module 160, which utilises the model produced by the Model Generation Module provides a model explorer user interface user for the end user to explore the model results. This is advantageously provided using a user interface which substantially mirrors the display of the input module which the end user used to enter their attributes and levels. This aspect adds to the overall user friendliness of the system and hides the substantial complexity of the backend system. For many lay-users the problem definition user interface and model explorer user interface may be their entire interaction with the system. That is they may simply describe the problem domain and the system automates all the intermediate steps, and then allows the lay-user to simply explore the predictions of their own input.

The model explorer user interface allows the end user to fully explore the results and the associated uncertainties, and thus provides them with a tool to obtain the necessary information to make an informed decision regarding their problem or query. Such end users can determine which features are most liked (or disliked) to assist in further decisions such as how to tweak an existing product to boost sales to a particular market segment, or what new features or combination of features are likely to be off most interest to the marketplace.

The user interface allows the system is to collect enough information from the investigator to set up a choice experiment, without requiring the investigator to have expert knowledge about choice modelling. Further the user interface is flexible and allows the user to perform a range of surveys with a range of complexity, and to then explore the result. Further the user interface may allow the investigator to create visual layouts of arbitrary complexity.

Those of skill in the art would understand that information and signals may be represented using any of a variety of technologies and techniques. For example, data, instructions, commands, information, signals, bits and symbols may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes or instructions may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A computational system for performing an online choice model, the system comprising:
   at least one processor;
   at least one memory operatively coupled to the at least one processor; and
   a plurality of modules, each of the modules comprising instructions for execution by the at least one processor, the plurality of modules comprising:
   a problem definition module comprising a problem definition user interface for receiving a plurality of attributes from a user wherein each attribute has an associated plurality of attribute levels;
   an online choice model survey module comprising:
      an experimental design generator module for generating a survey experimental design and an associated plurality of treatments;
      comprising a library of experimental designs,
      wherein the experimental design generator module determines the signature of the attribute space from the received plurality of attributes and associated attribute levels; and
      for one or more experimental designs in the library of experimental designs, performs one or more transformations until the signature of the transformed experimental design matches the signature of the attribute space to obtain one or more matching transformed experimental designs;
      wherein each transformation preserves the information properties of the untransformed experimental design;
      wherein the experimental design generator module selects the survey experimental design from the one or more matching transformed experimental designs; and
      wherein the experimental design generator module obtains a set of treatments from the selected survey experimental design;
      an online survey assembly module which receives the plurality of treatments and assembles an online survey from one or more survey templates pages, and a plurality of treatment representations created using the plurality of treatments received from the experimental design module;
      a data collection and sampling module for conducting the assembled online survey, wherein the data collection and sampling module allocates treatments to survey respondents and collects responses using the assembled online survey;
      a model generation module for receiving the data collected by the data collection and sampling module and building a model to obtain a plurality of model parameter estimates and errors from which a utility estimate can be obtained for each attribute level; and
      a model explorer module comprising a model explorer user interface for allowing the user to enter one or more attribute levels and obtain a model prediction of the expected utility;
   wherein the one or more transformations comprise one or more of the following group of transformations:
      factorial splitting of a factor F into two sub factors A, B where A×B=F and A or B match at least one unmatched factor in the signature;
      factorial expansion of a factor F into a new factor A×F where A×F matches at least one unmatched factor in the signature;
      factor truncation of a factor F into a new factor F−A where F−A matches at least one unmatched factor in the signature;
      full factorization by generation of a new factor F where F matches at least one unmatched factor in the signature; and
      deleting a factor F when all the other factors in the signature are matched.

2. The computational system as claimed in claim 1, wherein the problem definition user interface receives one or more survey constraints.

3. The computational system as claimed in claim 2, wherein the survey constraints comprise one or more criteria for selecting a survey experimental design.

4. The computational system as claimed in claim 1, wherein each transformation preserves the information properties of the untransformed experimental design.

5. The computational system as claimed in claim 1, wherein for each matching transformed experimental design, simulations are performed to estimate the performance characteristics of each matching design;
   wherein the survey constraints comprise one or more criteria for selecting a survey experimental design; and
   wherein the survey experimental design is selected based on the matching transformed design with the optimum performance characteristic according to the received criteria.

6. The computational system as claimed in claim 1, wherein the online choice model survey module further comprises an adaptive survey module for performing the survey in one or more survey phases, each phase comprising:
   generating a survey experimental design using the current signature;
   collecting a predefined number of samples;
   generating a model using the collected responses during the current phase;
   storing significant model coefficients using a predefined significance cutoff; and
   modifying the plurality of attributes and associated plurality of attribute levels based upon significant model coefficients identified and updating the current signature based upon the modified plurality of attributes and associated plurality of attribute levels.

7. The computational system as claimed in claim 1, wherein model generation module uses a Generalized Extreme Value (GEV) logit Model.

8. A computational system for performing an online choice model, the system comprising:
- at least one processor;
- at least one memory operatively coupled to the at least one processor; and
- a plurality of modules, each of the modules comprising instructions for execution by the at least one processor, the plurality of modules comprising:
  - a problem definition module comprising a problem definition user interface for receiving a plurality of attributes from a user wherein each attribute has an associated plurality of attribute levels;
  - an online choice model survey module comprising:
    - an experimental design generator module for generating a survey experimental design and an associated plurality of treatments;
    - comprising a library of experimental designs;
    - wherein the experimental design generator module determines the signature of the attribute space from the received plurality of attributes and associated attribute levels; and
    - for one or more experimental designs in the library of experimental designs, performs one or more transformations until the signature of the transformed experimental design matches the signature of the attribute space to obtain one or more matching transformed experimental designs;
    - wherein each transformation preserves the information properties of the untransformed experimental design;
    - wherein the experimental design generator module selects the survey experimental design from the one or more matching transformed experimental designs; and
    - wherein the experimental design generator module obtains a set of treatments from the selected survey experimental design;
  - an online survey assembly module which receives the plurality of treatments and assembles an online survey from one or more survey templates pages, and a plurality of treatment representations created using the plurality of treatments received from the experimental design module;
  - a data collection and sampling module for conducting the assembled online survey;
  - wherein the data collection and sampling module allocates treatments to survey respondents and collects responses using the assembled online survey;
  - a model generation module for receiving the data collected by the data collection and sampling module and building a model to obtain a plurality of model parameter estimates and errors from which a utility estimate can be obtained for each attribute level; and
  - a model explorer module comprising a model explorer user interface for allowing the user to enter one or more attribute levels and obtain a model prediction of the expected utility;
  - wherein the data collection and sampling module comprises a treatment allocation module, the treatment allocation module comprising:
    - an allocation frequency counter for counting the allocation of each treatment in the set of treatments, wherein the allocation frequency counter is initialized to be zero;
    - a receiver for receiving a request for a treatment to be provided to a survey respondent; and
    - an allocator for allocating a treatment to a survey respondent from the set of treatments;
    - wherein the allocated treatment is selected from the subset of treatments which have not previously been allocated to the survey respondent and whose allocation frequency differs by no more than a predetermined amount from the most allocated treatment in the set of treatments;
  - the computational system further comprising:
    - a length N global binary Deck Vector D which is initialized as a string of N ones indicating that all treatments are available where N is the number of treatments;
    - respondent allocation vector R of length N for each respondent for indicating whether a given treatments has been delivered to the respondent and is initialized as string of N ones;
    - a treatment for a respondent is selected by performing a binary AND between the Deck Vector D and respondent allocation vector R to obtain an availability vector A in which a one represents an available treatment,
    - the respondent is allocated a treatment by randomly selecting one of the positions in the availability vector having a value of one; and
    - then updating the global binary Deck Vector D and the respondent vector R by changing the state of the allocated position to a zero in both vectors.

9. The computational system as claimed in claim 8, further comprising an N length overflow vector which is initialized as a string of N ones; and
- wherein if there are no available positions in the availability vector A then:
  - a binary AND is performed between the respondent vector and the overflow vector to obtain a new availability vector A;
  - respondent is allocated a treatment by randomly selecting one of the positions in the availability vector having a value of one; and
  - then the overflow vector and the respondent vector are updated by changing the state of the allocated position to a zero in both vectors.

10. A method for computationally performing an online choice model, the method comprising:
- receiving a plurality of attributes from a user wherein each attribute has an associated plurality of attribute levels;
- generating a survey experimental design and an associated set of treatments, comprising the steps of:
  - determining the signature of the attribute space from the received plurality of attributes and associated attribute levels;
  - selecting one or more experimental designs from a library of experimental designs;
  - for each selected experimental design;
  - performing one or more transformations until the signature of the transformed experimental design matches the signature of the attribute space to obtain one or more matching transformed experimental designs;
  - wherein each transformation preserves the information properties of the untransformed experimental design;
  - selecting a survey experimental design from the one or more matching transformed experimental designs;

obtaining a set of treatments from the selected survey experimental design;
assembling an online survey, comprising the steps of:
creating a plurality of survey templates pages;
creating a plurality of treatment representations based on the set of treatments associated with the survey experimental design;
assembling the plurality of survey templates pages and plurality of treatment representations to form an online survey;
conducting an online survey, the online survey comprising
allocating each treatment to one or more respondents;
providing a plurality of combinations of treatments to the one or more respondents;
receiving the responses of the one or more respondents;
generating a model based upon the received responses to obtain a plurality of model parameter estimates and errors from which a utility estimate can be obtained for each attribute level; and
providing a model explorer user interface for allowing the user to enter one or more attribute levels and obtain a model prediction of the expected utility;
wherein the one or more transformations comprise one or more of the following group of transformations:
factorial splitting of a factor F into two sub factors A, B where A×B=F and A or B match at least one unmatched factor in the signature;
factorial expansion of a factor F into a new factor A×F where A×F matches at least one unmatched factor in the signature;
factor truncation of a factor F into a new factor F−A where F−A matches at least one unmatched factor in the signature;
full factorization by generation of a new factor F where F matches at least one unmatched factor in the signature; and
deleting a factor F when all the other factors in the signature are matched.

11. The method as claimed in claim 10, wherein each transformation preserves the information properties of the untransformed experimental design.

12. The method as claimed in claim 10, further comprising:
receiving one or more criteria for selecting the survey experimental design;
simulating the performance characteristics of each matching transformed experimental design; and
selecting the matching transformed experimental design as the survey experimental design with the optimum performance based upon the received one or more criteria.

13. The method as claimed in claim 10, wherein the online choice model survey is an adaptive survey comprising one or more survey phases, each phase comprising:
generating a survey experimental design using the current plurality of attributes and associated attribute levels;
collecting a predefined number of samples;
generating a model using the collected responses during the current phase;
storing significant model coefficients using a predefined significance cutoff; and
modifying the plurality of attributes and associated plurality of attribute levels based upon significant model coefficients identified and updating the current signature based upon the modified plurality of attributes and associated plurality of attribute levels.

14. The method as claimed in claim 13, wherein the modification of the plurality of attributes and associated plurality of attribute levels comprises removing attribute levels with non-significant model coefficients.

15. The method as claimed in claim 13, wherein the modification of the plurality of attributes and associated plurality of attribute levels comprises removing attribute levels with significant model coefficients.

16. The method as claimed in claim 13, wherein the modification of the plurality of attributes and associated plurality of attribute levels comprises:
removing attribute levels with non-significant model coefficients; and
creating a plurality of cross effects for a plurality of the significant model coefficients.

17. The method as claimed in claim 10, wherein a Generalized Extreme Value (GEV) logit Model is generated.

18. The method as claimed in claim 10, wherein the step of receiving a plurality of attributes from a user further comprises:
providing a user interface for receiving content and layout parameters relating to the online choice model survey from a user;
generating a plurality of survey template pages based on the content and layout parameters received from the user;
wherein at least one of the plurality of survey template pages comprises at least one treatment display zone, each treatment display zone comprising one or more associated layout parameters;
sending the set of treatments and the one or more layout parameters associated with each treatment zone to a content generator for generating a visual representation of a treatment; and
receiving a plurality of treatment representations from the content generator;
wherein in use, an online choice model survey is provided to a survey respondent comprising one or more web pages based upon the one or more survey template pages in which each of the treatment display zones displays one of the received visual representations of a treatment.

19. The method as claimed in claim 10, wherein the step of receiving a plurality of attributes from a user further comprises:
providing an attribute input user interface for receiving a plurality of attributes from a user for use in performing the online choice model, comprising:
one or more attribute zones wherein each attribute zone receives an attribute and a plurality of attribute levels associated with the attribute from the user; and
providing a model explorer user interface further comprises:
an attribute level selection zone for each attribute in the choice model;
wherein each attribute level selection zone allows a user to select one of the associated levels;
a prediction output zone which displays an estimate of the predicted response and variability estimate from the online choice model for the current attribute levels selected in the attribute level selection zone.

20. The method as claimed in claim 19, wherein attribute user interface further comprises a survey constraints zone for receiving one or more survey constraints.

21. The method as claimed in claim 20, wherein the survey constraints comprise a minimum accuracy.

22. The method as claimed in claim 20, wherein the survey constraints comprise a maximum survey size.

23. The method as claimed in claim 20, wherein the survey constraints comprise one or more criteria for selecting the survey experimental design.

24. The method as claimed in claim 19, wherein the attribute user interface allows the user to choose whether to perform the type of online choice model survey from the group consisting of Best/Worst, Paired Comparison or Alternative Specific, and the one or more attribute zones to display is based upon the selected choice model type.

25. The method as claimed in claim 19, wherein the step of creating a plurality of survey template pages is performed using a survey assembly user interface comprises:
 a content and layout user interface for receiving content and layout parameters from a user and generating a plurality of survey template pages;
 wherein at least one of the plurality of survey template pages comprises at least one treatment display zone;
 wherein each treatment display zone comprises one or more associated layout parameters; and
 a content generator interface for generating a visual representation of each treatment for use in a treatment display zone.

26. The method as claimed in claim 25, wherein the content generator comprises an uploading interface for digital content representing an attribute level for one or more attribute levels.

27. A method for generating a survey experimental design and an associated set of treatments for use in an online choice model, comprising the steps of:
 determining the signature of the attribute space from the received plurality of attributes and associated attribute levels;
 selecting one or more experimental designs from a library of experimental designs;
 for each selected experimental design;
 performing one or more transformations until the signature of the transformed experimental design matches the signature of the attribute space to obtain one or more matching transformed experimental designs;
 selecting a survey experimental design from the one or more matching transformed experimental designs; and
 obtaining a set of treatments from the selected survey experimental design;
 wherein the one or more transformations comprise one or more of the following group of transformations:
  factorial splitting of a factor F into two sub factors A, B where A×B=F and A or B match at least one unmatched factor in the signature;
  factorial expansion of a factor F into a new factor A×F where A×F matches at least one unmatched factor in the signature;
  factor truncation of a factor F into a new factor F−A where F−A matches at least one unmatched factor in the signature;
  full factorization by generation of a new factor F where F matches at least one unmatched factor in the signature; and
  deleting a factor F when all the other factors in the signature are matched.

28. The method as claimed in claim 27, wherein each transformation preserves the information properties of the untransformed experimental design.

29. The method as claimed in claim 27, further comprising:
 receiving one or more criteria for selecting the survey experimental design;
 simulating the performance characteristics of each matching transformed experimental design; and
 selecting the matching transformed experimental design as the survey experimental design with the optimum performance based upon the received one or more criteria.

30. The method as claimed in claim 29, wherein the simulations are performed for a range of sample sizes.

31. A method for allocating a treatment to a survey respondent from a set of treatments in an online choice model survey, comprising the steps of:
 receiving a set of treatments for use in an online choice model survey;
 initializing an allocation frequency counter for each treatment in the set of treatments;
 receiving a request for a treatment to be provided to a survey respondent;
 creating a length N global binary Deck Vector D and initializing as a string of N ones indicating that all treatments are available where N is the number of treatments;
 creating a respondent allocation vector R of length N for each respondent for indicating whether a given treatments has been delivered to the respondent and initializing each respondent vector as string of N ones; and
 allocating a treatment to a survey respondent from the set of treatments;
 wherein the allocated treatment is selected from the subset of treatments which have not previously been allocated to the survey respondent and whose allocation frequency differs by no more than a predefined maximum difference amount from the most allocated treatment in the set of treatments;
 wherein allocating a treatment to a survey respondent from the set of treatments comprises:
  generating an availability vector A by performing a binary AND between the global binary Deck Vector D and respondent allocation vector R to obtain an availability vector A in which a one represents an available treatment;
  randomly selecting one of the available positions in the availability vector A;
  allocating the selected treatment to the respondent; and
  updating the global binary Deck Vector D and the respondent vector R by changing the state of the allocated position to a zero in both vectors.

32. The method as claimed in claim 31, wherein the predefined maximum difference amount is 1.

33. A method for allocating a treatment to a survey respondent from a set of treatments in an online choice model survey, comprising the steps of:
 receiving a set of treatments for use in an online choice model survey;
 initializing an allocation frequency counter for each treatment in the set of treatments;
 receiving a request for a treatment to be provided to a survey respondent; and
 allocating a treatment to a survey respondent from the set of treatments;
 wherein the allocated treatment is selected from the subset of treatments which have not previously been allocated to the survey respondent and whose allocation frequency differs by no more than a predefined maximum difference amount from the most allocated treatment in the set of treatments;
 wherein allocating a treatment to a survey respondent from the set of treatments comprises:
  creating an N length overflow vector O which is initialized as a string of N ones;

creating a new availability vector if there are no available positions in the availability vector A by performing a binary AND between the respondent vector and the overflow vector;

randomly selecting one of the available positions in the new availability vector A;

allocating the selected treatment to the respondent; and updating the overflow vector O and the respondent vector R by changing the state of the allocated position to a zero in both vectors.

34. A non-transitory computer readable medium, comprising computer executable instructions for causing a processor to perform a method comprising:

receiving a plurality of attributes from a user wherein each attribute has an associated plurality of attribute levels;

generating a survey experimental design and an associated set of treatments, comprising the steps of:

determining the signature of the attribute space from the received plurality of attributes and associated attribute levels;

selecting one or more experimental designs from a library of experimental designs;

for each selected experimental design:

performing one or more transformations until the signature of the transformed experimental design matches the signature of the attribute space to obtain one or more matching transformed experimental designs;

selecting a survey experimental design from the one or more matching transformed experimental designs;

obtaining a set of treatments from the selected survey experimental design;

assembling an online survey, comprising the steps of:

creating a plurality of survey templates pages;

creating a plurality of treatment representations based on the set of treatments associated with the survey experimental design;

assembling the plurality of survey templates pages and plurality of treatment representations to form an online survey;

conducting an online survey, the online survey comprising allocating each treatment to one or more respondents;

providing a plurality of combinations of treatments to the one or more respondents;

receiving the responses of the one or more respondents;

generating a model based upon the received responses to obtain a plurality of model parameter estimates and errors from which a utility estimate can be obtained for each attribute level; and providing a model explorer user interface for allowing the user to enter one or more attribute levels and obtain a model prediction of the expected utility, wherein the one or more transformations comprise one or more of the following group of transformations:

factorial splitting of a factor F into two sub factors A, B where A×B=F and A or B match at least one unmatched factor in the signature;

factorial expansion of a factor F into a new factor A×F where A×F matches at least one unmatched factor in the signature;

factor truncation of a factor F into a new factor F−A where F−A matches at least one unmatched factor in the signature;

full factorization by generation of a new factor F where F matches at least one unmatched factor in the signature; and deleting a factor F when all the other factors in the signature are matched.

* * * * *

UNITED STATES PATENT AND TRADEMARK OFFICE
CERTIFICATE OF CORRECTION

PATENT NO.        : 8,799,186 B2
APPLICATION NO.   : 13/882867
DATED             : August 5, 2014
INVENTOR(S)       : Ben White et al.

It is certified that error appears in the above-identified patent and that said Letters Patent is hereby corrected as shown below:

In the Specification

In column 8 at line 36, Change "asystematic" to --a systematic--.

In column 12 at line 66, Change "$P_m$" to --$P_{ni}$--.

In column 13 at line 1, Change "$x_n$," to --$x_{ni}$--.

In column 13 at line 41, Change "Experimental." to --Experimental--.

In column 16 at line 42 (approx.), Change "candy bar," to --candybar,--.

In column 16 at line 42 (approx.), Change "$70" to --$70.--.

In column 18 at lines 58-59, Change "treatment, and treatment)" to --treatmenti and treatmentj)--.

In column 30 at line 40, After "HTML," delete "XML.".

In the Claims

In column 33 at lines 29-67 (thru Col. 34, lines 1-34,), In Claim 1, change
"1. A computational system for performing an online choice model, the system comprising: at least one processor; at least one memory operatively coupled to the at least one processor; and a plurality of modules, each of the modules comprising instructions for execution by the at least one processor, the plurality of modules comprising: a problem definition module comprising a problem definition user interface for receiving a plurality of attributes from a user wherein each attribute has an associated plurality of attribute levels; an online choice model survey module comprising: an experimental design generator module for generating a survey experimental design and an associated plurality of treatments; comprising a library of experimental designs, wherein the experimental design generator module determines the signature of the attribute space from the received plurality of attributes and associated attribute levels; and for one or more experimental designs in the library of experimental Signed and Sealed this
Fourteenth Day of April, 2015

Michelle K. Lee
*Director of the United States Patent and Trademark Office*

CERTIFICATE OF CORRECTION (continued)
U.S. Pat. No. 8,799,186 B2

Column 33 at lines 29-67 (thru Col. 34, lines 1-34,) cont'd.

designs, performs one or more transformations until the signature of the transformed experimental design matches the signature of the attribute space to obtain one or more matching transformed experimental designs; wherein each transformation preserves the information properties of the untransformed experimental design; wherein the experimental design generator module selects the survey experimental design from the one or more matching transformed experimental designs; and wherein the experimental design generator module obtains a set of treatments from the selected survey experimental design; an online survey assembly module which receives the plurality of treatments and assembles an online survey from one or more survey templates pages, and a plurality of treatment representations created using the plurality of treatments received from the experimental design module; a data collection and sampling module for conducting the assembled online survey, wherein the data collection and sampling module allocates treatments to survey respondents and collects responses using the assembled online survey; a model generation module for receiving the data collected by the data collection and sampling module and building a model to obtain a plurality of model parameter estimates and errors from which a utility estimate can be obtained for each attribute level; and a model explorer module comprising a model explorer user interface for allowing the user to enter one or more attribute levels and obtain a model prediction of the expected utility; wherein the one or more transformations comprise one or more of the following group of transformations: factorial splitting of a factor F into two sub factors A, B where $A \times B = F$ and A or B match at least one unmatched factor in the signature; factorial expansion of a factor F into a new factor $A \times F$ where $A \times F$ matches at least one unmatched factor in the signature; factor truncation of a factor F into a new factor F-A where F-A matches at least one unmatched factor in the signature; full factorization by generation of a new factor F where F matches at least one unmatched factor in the signature; and deleting a factor F when all the other factors in the signature are matched." to --1. A computational system for performing an online choice model, the system comprising: at least one processor; and at least one memory operatively coupled to the at least one processor; the at least one memory storing instructions for execution by the at least one processor; wherein the at least one processor is configured to: provide a problem definition user interface for receiving a plurality of attributes from a user wherein each attribute has an associated plurality of attribute levels; generate a survey experimental design and an associated plurality of treatments; determine the signature of the attribute space from the received plurality of attributes and associated attribute levels; perform, for one or more experimental designs in a library of experimental designs, one or more transformations until the signature of the transformed experimental design matches the signature of the attribute space to obtain one or more matching transformed experimental designs, wherein each transformation preserves the information properties of the untransformed experimental design; select the survey experimental design from the one or more

CERTIFICATE OF CORRECTION (continued)
U.S. Pat. No. 8,799,186 B2

Column 33 at lines 29-67 (thru Col. 34, lines 1-34,) cont'd.

matching transformed experimental designs; obtain a set of treatments from the selected survey experimental design; receive the plurality of treatments and assemble an online survey from one or more survey templates pages, and a plurality of treatment representations created using the plurality of treatments; conduct the assembled online survey based on allocating treatments to survey respondents and collecting responses with the assembled online survey; receive the collected data and build a model to obtain a plurality of model parameter estimates and errors from which a utility estimate can be obtained for each attribute level; and provide a model explorer user interface for allowing the user to enter one or more attribute levels and obtain a model prediction of the expected utility; wherein the one or more transformations comprise one or more of the following group of transformations: factorial splitting of a factor F into two sub factors A, B where A×B=F and A or B match at least one unmatched factor in the signature; factorial expansion of a factor F into a new factor A×F where A×F matches at least one unmatched factor in the signature; factor truncation of a factor F into a new factor F-A where F-A matches at least one unmatched factor in the signature; full factorization by generation of a new factor F where F matches at least one unmatched factor in the signature; and deleting a factor F when all the other factors in the signature are matched.--.

In column 34 at line 45, In Claim 5, after "wherein" insert --the at least one processor is configured to perform simulations--.

In column 34 at lines 45-46, In Claim 5, change "design, simulations are performed" to --design--.

In column 34 at line 50, In Claim 5, after "wherein" insert --the at least one processor is configured to select--.

In column 34 at line 50, In Claim 5, after "design" delete "is selected".

In column 34 at lines 55-56, In Claim 6, change "online choice model survey module further comprises an adaptive survey module for performing" to --at least one processor is configured to perform--.

In column 35 at line 4, In Claim 7, change "model generation module uses" to --the at least one processor is configured to--.

In column 35 at lines 6-67 (thru Col. 36, lines 1-33,), In Claim 8, change "8. A computational system for performing an online choice model, the system comprising: at least one processor; at least one memory operatively coupled to the at least one processor; and a plurality of modules, each of the modules comprising instructions for execution by the at least one processor, the plurality of modules comprising: a problem definition module comprising a problem definition user interface for receiving a plurality of attributes from a user wherein each attribute has an associated plurality of attribute levels; an online choice model survey module comprising: an experimental design generator module Column 35 at lines 6-67 (thru Col. 36, lines 1-33,), cont'd.

for generating a survey experimental design and an associated plurality of treatments; comprising a library of experimental designs; wherein the experimental design generator module determines the signature of the attribute space from the received plurality of attributes and associated attribute levels; and for one or more experimental designs in the library of experimental designs, performs one or more transformations until the signature of the transformed experimental design matches the signature of the attribute space to obtain one or more matching transformed experimental designs; wherein each transformation preserves the information properties of the untransformed experimental design; wherein the experimental design generator module selects the survey experimental design from the one or more matching transformed experimental designs; and wherein the experimental design generator module obtains a set of treatments from the selected survey experimental design; an online survey assembly module which receives the plurality of treatments and assembles an online survey from one or more survey templates pages, and a plurality of treatment representations created using the plurality of treatments received from the experimental design module; a data collection and sampling module for conducting the assembled online survey; wherein the data collection and sampling module allocates treatments to survey respondents and collects responses using the assembled online survey; a model generation module for receiving the data collected by the data collection and sampling module and building a model to obtain a plurality of model parameter estimates and errors from which a utility estimate can be obtained for each attribute level; and a model explorer module comprising a model explorer user interface for allowing the user to enter one or more attribute levels and obtain a model prediction of the expected utility; wherein the data collection and sampling module comprises a treatment allocation module, the treatment allocation module comprising: an allocation frequency counter for counting the allocation of each treatment in the set of treatments, wherein the allocation frequency counter is initialized to be zero; a receiver for receiving a request for a treatment to be provided to a survey respondent; and an allocator for allocating a treatment to a survey respondent from the set of treatments; wherein the allocated treatment is selected from the subset of treatments which have not previously been allocated to the survey respondent and whose allocation frequency differs by no more than a predetermined amount from the most allocated treatment in the set of treatments; the computational system further comprising: a length N global binary Deck Vector D which is initialized as a string of N ones indicating that all treatments are available where N is the number of treatments; respondent allocation vector R of length N for each respondent for indicating whether a given treatments has been delivered to the respondent and is initialized as string of N ones; a treatment for a respondent is selected by performing a binary AND between the Deck Vector D and respondent allocation vector R to obtain an availability vector A in which a one represents an available treatment, the respondent is allocated a treatment by randomly

CERTIFICATE OF CORRECTION (continued)
U.S. Pat. No. 8,799,186 B2

Column 35 at lines 6-67 (thru Col. 36, lines 1-33,), cont'd.

selecting one of the positions in the availability vector having a value of one; and then updating the global binary Deck Vector D and the respondent vector R by changing the state of the allocated position to a zero in both vectors." to --8. A computational system for performing an online choice model, the system comprising: at least one processor; and at least one memory operatively coupled to the at least one processor; the at least one memory storing instructions for execution by the at least one processor; wherein the at least one processor is configured to: provide a problem definition user interface for receiving a plurality of attributes from a user wherein each attribute has an associated plurality of attribute levels; generate a survey experimental design and an associated plurality of treatments; determine the signature of the attribute space from the received plurality of attributes and associated attribute levels; perform, for one or more experimental designs in a library of experimental designs, one or more transformations until the signature of the transformed experimental design matches the signature of the attribute space to obtain one or more matching transformed experimental designs, wherein each transformation preserves the information properties of the untransformed experimental design; select the survey experimental design from the one or more matching transformed experimental designs; obtain a set of treatments from the selected survey experimental design; receive the plurality of treatments and assemble an online survey from one or more survey templates pages, and a plurality of treatment representations created using the plurality of treatments; conduct the assembled online survey based on allocating treatments to survey respondents and collecting responses with the assembled online survey; receive the collected data and build a model to obtain a plurality of model parameter estimates and errors from which a utility estimate can be obtained for each attribute level; provide a model explorer user interface for allowing the user to enter one or more attribute levels and obtain a model prediction of the expected utility; count the allocation frequency of each treatment in the set of treatments, wherein the allocation frequency count is initialized to be zero; receive a request for a treatment to be provided to a survey respondent; allocate a treatment to a survey respondent from the set of treatments, wherein the allocated treatment is selected from the subset of treatments which have not previously been allocated to the survey respondent and whose allocation frequency differs by no more than a predetermined amount from the most allocated treatment in the set of treatments; initialize a length N global binary Deck Vector D as a string of N ones indicating that all treatments are available where N is the number of treatments; initialize a respondent allocation vector R of length N for each respondent as a string of N ones; indicate whether a given treatment has been delivered to the respondent using the respondent allocation vector R; select a treatment for a respondent based on performing a binary AND between the Deck Vector D and respondent allocation vector R to obtain an availability vector A in which a one represents an available treatment; allocate a treatment to the respondent based on randomly Column 35 at lines 6-67 (thru Col.

36, lines 1-33,), cont'd.
selecting one of the positions in the availability vector having a value of one; and update the global binary Deck Vector D and the respondent vector R based on changing the state of the allocated position to a zero in both vectors.--.

In column 36 at lines 34-47, In Claim 9, change "9. The computational system as claimed in claim 8, further comprising an N length overflow vector which is initialized as a string of N ones; and wherein if there are no available positions in the availability vector A then: a binary AND is performed between the respondent vector and the overflow vector to obtain a new availability vector A; respondent is allocated a treatment by randomly selecting one of the positions in the availability vector having a value of one; and then the overflow vector and the respondent vector are updated by changing the state of the allocated position to a zero in both vectors." to --9. The computational system as claimed in claim 8, the at least one processor further configured to: initialize an N length overflow vector as a string of N ones; determine if there are no available positions in the availability vector A; perform a binary AND between the respondent vector and the overflow vector to obtain a new availability vector A in response to determining that there are no available positions in the availability vector A; allocate a treatment to a respondent based on randomly selecting one of the positions in the availability vector having a value of one; and update the overflow vector and the respondent vector based on changing the state of the allocated position to a zero in both vectors.--.

In column 38 at line 15, In Claim 17, change "wherein" to --further comprising generating--.
In column 38 at line 16, In Claim 17, change "Model is generated." to --Model.--.
In column 40 at line 33, In Claim 31, change "by" to --based on--.
In column 40 at line 43, In Claim 31, change "by" to --based on--.
In column 41 at line 2, In Claim 33, change "by" to --based on--.
In column 41 at line 9, In Claim 33, change "by" to --based on--.